(12) United States Patent
Baskaran et al.

(10) Patent No.: US 10,536,314 B2
(45) Date of Patent: Jan. 14, 2020

(54) OFDMA APPARATUS AND METHOD THEREOF FOR PERFORMING OFDM BASED COMMUNICATION IN WIRELESS COMMUNICATION SYSTEM

(71) Applicants: Centre of Excellence in Wireless Technology, Chennai (IN); Indian Institute of Technology Madras (IIT Madras), Chennai (IN)

(72) Inventors: Dhivagar Baskaran, Chennai (IN); Jeniston Deviraj Klutto Milleth, Chennai (IN); Sunil Kaimalettu, Chennai (IN); Navinnath Palanisamy, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 68 days.

(21) Appl. No.: 15/614,326

(22) Filed: Jun. 5, 2017

(65) Prior Publication Data

US 2017/0353342 A1 Dec. 7, 2017

(30) Foreign Application Priority Data

Jun. 3, 2016 (IN) .............................. 201641019275
Jul. 12, 2016 (IN) .............................. 201641023833

(51) Int. Cl.
*H04W 12/00* (2009.01)
*H04L 27/26* (2006.01)
*H04L 5/00* (2006.01)

(52) U.S. Cl.
CPC ........ *H04L 27/2628* (2013.01); *H04L 5/0048* (2013.01); *H04L 5/0062* (2013.01); *H04L 5/0073* (2013.01); *H04L 27/2636* (2013.01)

(58) Field of Classification Search
CPC . H04L 27/2628; H04L 5/0048; H04L 5/0062; H04L 5/0073; H04L 27/2636
(Continued)

(56) References Cited

U.S. PATENT DOCUMENTS

| 7,158,579 | B2 * | 1/2007 | Hottinen | .............. | H04B 7/0615 |
| | | | | | 375/267 |
| 2001/0022777 | A1 * | 9/2001 | Bourget | ................ | H04L 5/0007 |
| | | | | | 370/210 |

(Continued)

*Primary Examiner* — Sai Ming Chan

(57) ABSTRACT

Embodiments herein provide an OFDMA method for performing OFDM based communication in a wireless communication system. The OFDMA method includes splitting a carrier bandwidth into a number of subbands and modulating resource units in each of the subbands with data symbols in a parallel manner. Further, multiplexing the resource units by transforming each of the modulated resource units through a plurality of unitary transformations at a stage. Further, generating an output by performing a parallel to serial conversion of the transformed resource units. Further, the OFDMA method includes generating an OFDM signal by multiplexing an output from at least one of the previous stage to another stage by transforming the output through a unitary transformation for a defined number of times. Furthermore, the OFDMA method includes transmitting the OFDM signal over a wireless channel in the wireless network system.

50 Claims, 19 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2007/0159958 A1* | 7/2007 | Ahn ...................... | H04L 1/0041 |
| | | | 370/208 |
| 2008/0025267 A1* | 1/2008 | Wei ....................... | H04L 1/0025 |
| | | | 370/337 |
| 2008/0123618 A1* | 5/2008 | Papadopoulos ....... | H04L 1/0625 |
| | | | 370/345 |
| 2010/0008432 A1* | 1/2010 | Kim ...................... | H04L 5/0007 |
| | | | 375/260 |
| 2017/0012749 A1* | 1/2017 | Rakib .................... | H04L 5/0007 |

* cited by examiner

OFDMA APPARATUS AND METHOD THEREOF FOR PERFORMING OFDM BASED COMMUNICATION IN WIRELESS COMMUNICATION SYSTEM

TECHNICAL FIELD

The present invention generally relates to a wireless communication systems and more particularly to an OFDMA method and OFDMA apparatus for performing OFDM based communication in a wireless communication system. The present application is based on, and claims priority from, both the Indian Application Numbers, 201641019275 filed on 3 Jun. 2016 and 201641023833 filed on 12 Jul. 2016 the disclosure of which is hereby incorporated by reference.

BACKGROUND

Orthogonal frequency division multiplexing access (OFDMA) or its variant; which are orthogonal frequency division multiplexing (OFDM) based technique is adopted in recent wireless systems for multiple accesses in the downlink (DL) and/or uplink (UL) to provide broadband connectivity to users. It is due to its ability to exploit frequency diversity using multi user scheduling along with forward error correcting code (FEC), and also ease of implementation using computationally efficient IFFT/FFT modules. Moreover, OFDM systems can also be scaled to multiple input, multiple output (MIMO) systems with any number of antennas both at the transmitter and receiver. The main goal of the existing cellular technologies is to serve broadband data to the users in a spectrally efficient manner, and also to provide higher data rate to the users. Long term evolution advanced (LTE-A), which is also an OFDM based MIMO system, and it supports only a fixed subcarrier spacing of 15 KHz for its data transmission to the users.

Due to the exponential growth in the data rate requirement there is a need to support larger bandwidth transmission. Also simultaneously, there is a need for supporting power efficient low bit rate transmissions due to the recent development in the Internet of things (IoT). Moreover, there is a requirement of the ensuing technology to meet conflicting requirements like simultaneous support of low and high data rate, high and low latency reliable communication using an unified design.

A new radio access technology (NRAT) is being designed for the $5^{th}$ generation (5G) system and is expected to support multiple requirements using the same technology. Different services like enhanced mobile broadband (eMBB), ultra-reliable low latency communication (URLLC), enhanced machine type communication (eMTC) etc., are expected to be supported within a single component carrier bandwidth. The 3GPP group currently focuses on defining a new waveform for the 5G technology, for providing better spectral localization, low PAPR, and higher spectral efficiency. Many waveforms including filter bank multi carrier (FBMC), generalized frequency division multiplexing (GFDM), universal filtered multicarrier (UFMC), variants of the OFDM, and discrete Fourier transform-spread-OFDM (DFT-S-OFDM) with windowing or filtering are being considered as possible candidate for the new waveform for the 5G technology.

The main challenge of the NRAT in supporting the different services is to serve them using a unified frame structure with a single waveform. Also, it should support different subcarrier spacing across smaller subbands of a single larger component carrier bandwidth. Each subcarrier spacing corresponds to certain numerology. The bands corresponding to different numerology experience different channel conditions, and therefore, the effective symbol duration and other requirements like cyclic prefix (CP) or related variants like guard period or guard band are different for different numerologies. Co-existence of different numerologies creates inter-carrier interference (ICI) and in turn inter-numerology interference (INI) due to different subcarrier spacing and different CP requirements.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide an Orthogonal Frequency Division Multiple Access (OFDMA) method for performing Orthogonal Frequency Division Multiplexing (OFDM) based communication in a wireless communication system.

Another object of the embodiments herein is to split a carrier bandwidth into a number of sub bands.

Another object of the embodiments herein is to modulate resource units in each of the sub bands with data symbols in a parallel manner.

Another object of the embodiments herein is to multiplex the resource units by transforming each of the modulated resource units through a plurality of first unitary transformations.

Another object of the embodiments herein is to generate a plurality of first OFDM signals by performing a parallel to serial conversion of the transformed resource units.

Another object of the embodiments herein is to multiplex samples of at least one OFDM signal from the plurality of first OFDM signals by transforming the samples through a second unitary transformation.

Another object of the embodiments herein is to generate a second OFDM signal by performing a parallel to serial conversion of the transformed samples and transmitting, the second OFDM signal over a wireless channel in the wireless network system.

Yet another object of the embodiments herein is to receive a first OFDM signal and performing a serial to parallel conversion of the received OFDM signal.

Yet another object of the embodiments herein is to demultiplex samples of the first OFDM signal by transforming the samples through a first unitary transformation.

Yet another object of the embodiments herein is to perform a serial to parallel conversion of the transformed samples of the first OFDM signal thereby generating a plurality of second OFDM signals.

Yet another object of the embodiments herein is to demultiplex at least one second OFDM signal from the plurality of second OFDM signals by transforming the at least one second OFDM signal through a plurality of second unitary transformations.

Yet another object of the embodiments herein is to demodulate the resource units in each subband, of the at least one transformed second OFDM signal, with data symbol in a parallel manner.

Further, yet another object of the embodiments herein is to split a carrier bandwidth into a number of subbands and modulating resource units in each of the subbands with data symbols in a parallel manner.

Further, yet another object of the embodiments herein is to multiplex by the resource units by transforming each of the modulated resource units through a plurality of unitary transformations at a stage Further, yet another object of the embodiments herein is to generate an output by performing a parallel to serial conversion of the transformed resource units.

Further, yet another object of the embodiments herein is to generate a OFDM signal by multiplexing the output from at least one of the previous stage to another stage by transforming the output through an unitary transformation for a defined number of times.

Further, yet another object of the embodiments herein is to transmit the OFDM signal over a wireless channel in the wireless communication system.

Further, yet another object of the embodiments herein is to provide an enhanced flexi orthogonal frequency division multiple access for 5G systems and beyond to support different numerology across smaller subbands of a single larger component carrier bandwidth. Multiple larger component carrier can be addressed using carrier aggregation.

Accordingly embodiments herein provide an OFDMA method for performing an OFDM based communication in a wireless communication system. The OFDMA method includes splitting a carrier bandwidth into a number of subbands. Further, the OFDMA method includes modulating resource units in each of the subbands with data symbols in a parallel manner. Further, the OFDMA method includes multiplexing the resource units by transforming each of the modulated resource units through a plurality of first unitary transformations. Further, the OFDMA method includes generating a plurality of first OFDM signals by performing a parallel to serial conversion of the transformed resource units. Further, the OFDMA method includes multiplexing samples of at least one OFDM signal from the plurality of first OFDM signals by transforming the samples through a second unitary transformation. Further, the OFDMA method includes generating a second OFDM signal by performing a parallel to serial conversion of the transformed samples. Furthermore, the OFDMA method includes transmitting the second OFDM signal over a wireless channel in the wireless communication system.

In an embodiment, the plurality of first unitary transformation is at least one of an Inverse Fast Fourier Transform (IFFT), a Fast Fourier Transform (FFT) and other unitary transformation, where the second unitary transformation can be an IFFT, a FFT and other unitary transformation.

In an embodiment, the plurality of first OFDM signals is one of same OFDM symbol duration and different OFDM symbol duration.

In an embodiment, the samples of the at least one first OFDM signal are sampled at a uniform interval.

In an embodiment, numerology of each of the first unitary transformation is determined based on the carrier bandwidth and a size of corresponding unitary transformation.

In an embodiment, the numerology demultiplexed at the first unitary transformation is one of a same numerology, a different numerology and a mixed-numerology, wherein the numerology of the at least one unitary transformation from the plurality of second unitary transformations is demultiplexed at the second unitary transformation.

In an embodiment, a channel handling technique is applied to at least one of the resource units of each of the subbands before transforming using the plurality of first unitary transformations, each of the subbands of each of the first OFDM signals before transforming using the second unitary transformation, and a block of OFDM sub-symbols of the second OFDM signal before transmitting over the wireless channel.

In an embodiment, the channel handling technique uses at least one of a cyclic prefix removal, zero tail addition, channel estimation, frequency domain equalization (FDE), a customized filter and a window.

In an embodiment, at least one of a guard band and a guard time is applied depending on at least one of the customized filter and the window used.

In an embodiment, the window used with the channel handling technique is one of a raised cosine (RC), a root raised cosine (RRC) window and other Nyquist windows.

Accordingly, the embodiments herein provide an OFDMA method for performing OFDM based communication in a wireless communication system. The OFDMA method includes receiving a first OFDM signal and performing a serial to parallel conversion of the first OFDM signal. Further, the OFDMA method includes demultiplexing samples of the first OFDM signal by transforming the samples through a first unitary transformation. Further, the OFDMA method includes performing by a serial to parallel conversion of the transformed samples of the first OFDM signal thereby generating a plurality of second OFDM signals. Further, the OFDMA method includes demultiplexing by the OFDM apparatus at least one second OFDM signal from the plurality of second OFDM signals by transforming the at least one second OFDM signal through a plurality of second unitary transformations. Furthermore, the OFDMA method includes demodulating the resource units in each subband, of the at least one transformed second OFDM signal, with data symbol in a parallel manner.

In an embodiment, the first unitary transformation is one of an Inverse Fast Fourier Transform (IFFT), a Fast Fourier Transform (FFT) and other unitary transformation, and wherein the plurality of second unitary transformations is at least one of an IFFT, a FFT and other unitary transformation.

In an embodiment, the plurality of second OFDM signals is one of a same OFDM symbol duration and a different OFDM symbol duration.

In an embodiment, the samples of the at least one second OFDM signal are sampled at a uniform interval.

In an embodiment, numerology of each of the unitary transformation from the plurality of second unitary transformations is determined based on a carrier bandwidth and a size of corresponding unitary transformation.

In an embodiment, wherein the numerology is demultiplexed at the first unitary transformation is one of a same numerology, a different numerology and a mixed-numerology, wherein the numerology of the at least one unitary transformation from the plurality of second unitary transformations is demultiplexed at the second unitary transformation.

In an embodiment, the channel handling technique uses at least one of a cyclic prefix removal, removing tail and overlapping in front, channel estimation, Frequency Domain Equalization (FDE), a customized filter and a window.

In an embodiment, the window used with the channel handling technique is one of a raised cosine (RC), a root raised cosine (RRC) window, and other Nyquist windows.

Accordingly, embodiments herein provide an OFDMA method for performing OFDM based communication in a wireless communication system. The OFDMA method includes splitting a carrier bandwidth into a number of subbands and modulating resource units in each of the subbands with data symbols in a parallel manner. Further, the OFDMA method includes multiplexing the resource units by transforming each of the modulated resource units through a plurality of unitary transformations at a stage. Further, the OFDMA method includes generating an output by performing a parallel to serial conversion of the transformed resource units. Further, the OFDMA method includes generating an OFDM signal by multiplexing an output from at least one of the previous stage to another stage by transforming the output through a unitary transformation for a defined number of times. Furthermore, the OFDMA method includes transmitting the OFDM signal over a wireless channel in the wireless communication system.

In an embodiment, multiplexing the output from at least one of the previous stage to another stage iteratively by transforming through includes: multiplexing the output from the previous stage by transforming the output through a unitary transformation at another stage, and performing a parallel to serial conversion of the transformed output from the another stage, where the multiplexing and the parallel to serial conversion steps are iterated by providing an output from the previous stage to another stage for the defined number of times to generate the OFDM signal.

In an embodiment, the output comprises at least one OFDM signal from at least one of the previous stages.

In an embodiment, numerology of each of the unitary transformation in each stage is determined based on the carrier bandwidth and a size of corresponding unitary transformation.

In an embodiment, a set of the numerology are multiplexed at one unitary transformation is followed by another numerology multiplexed at another unitary transformation.

In an embodiment, the unitary transformation is at least one of an Inverse Fast Fourier Transform (IFFT), a Fast Fourier Transform (FFT) and other unitary transformation.

Accordingly, embodiments herein provide an OFDMA method for performing OFDM based communication in a wireless communication system. The OFDMA method includes receiving an OFDM signal and generating an output by demultiplexing samples of the OFDM signal from one stage to another stage by transforming the OFDM signal through a unitary transformation for a defined number of times. Further, the ODFMA method includes performing a serial to parallel conversion of the transformed samples of the OFDM signal there by generating an output. Furthermore, the OFDMA method includes demultiplexing the output by transforming the output through a plurality of unitary transformations and obtaining data symbols by demodulating the at least one transformed output in a parallel manner.

In an embodiment, demultiplexing samples of the OFDM signal from one stage to another stage by transforming the OFDM signal through the unitary transformation for the defined number of times includes: demultiplexing the samples of the OFDM signal from one stage by transforming the output through a unitary transformation at the other stage, and performing a parallel to serial conversion of the transformed OFDM signal from the another stage, where the demultiplexing and the parallel to serial conversion steps are iterated by providing an output from a previous stage to another stage for the defined number of times to generate the output.

In an embodiment, numerology of each of the unitary transformation in each stage is determined based on the carrier bandwidth and a size of corresponding unitary transformation.

In an embodiment, a set of the numerology are multiplexed at one unitary transformation is followed by another numerology multiplexed at another unitary transformation.

In an embodiment, the unitary transformation is at least one of an Inverse Fast Fourier Transform (IFFT), a Fast Fourier Transform (FFT) and other unitary transformation.

Accordingly, embodiments herein provide a wireless communication system for performing OFDMA in an OFDM based communication. The wireless communication system includes a first OFDMA apparatus configured to: split a carrier bandwidth into a number of subbands, modulate resource units in each of the subbands with data symbols in a parallel manner, multiplex the resource units by transforming each of the modulated resource units through a plurality of first unitary transformations, generate a plurality of first OFDM signals by performing a parallel to serial conversion of the transformed resource units, multiplex samples of at least one OFDM signal from the plurality of OFDM signals by transforming the samples through a second unitary transformation, generate a second OFDM signal by performing a parallel to serial conversion of the transformed samples, and transmit the second OFDM signal over a wireless channel in the wireless network system.

Further, the wireless communication system includes a second OFDMA apparatus configured to: receive the second OFDM signal, perform a serial to parallel conversion of the received second OFDM signal, demultiplex samples of the second OFDM signal by transforming the samples through an inverse of the second unitary transformation, perform a serial to parallel conversion of the transformed samples of the second OFDM signal there by generating the plurality of first OFDM signals, demultiplex by the OFDM apparatus at least one second OFDM signal from the plurality of second OFDM signals by transforming the at least one second OFDM signal through a plurality of second unitary transformations, and demodulate the resource units in each subband, of the at least one transformed second OFDM signal, with data symbol in a parallel manner.

Accordingly, embodiments herein provide an OFDMA method for performing OFDM based communication in a wireless communication system. The OFDMA method includes selecting at least one subband and at least one Resource Block (RB) comprising data on a carrier bandwidth with different numerologies, where the at least one subband and the at least one RB corresponding to at least one particular numerology from the different numerologies. Further, the OFDMA method includes indicating the at least one subband in a grant signal based on a first bitmap to another OFDMA apparatus in the wireless communication system. Furthermore, the OFDMA method includes indicating the at least one RB in a grant signal based on a second bitmap to another OFDMA apparatus in the wireless communication system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications can be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
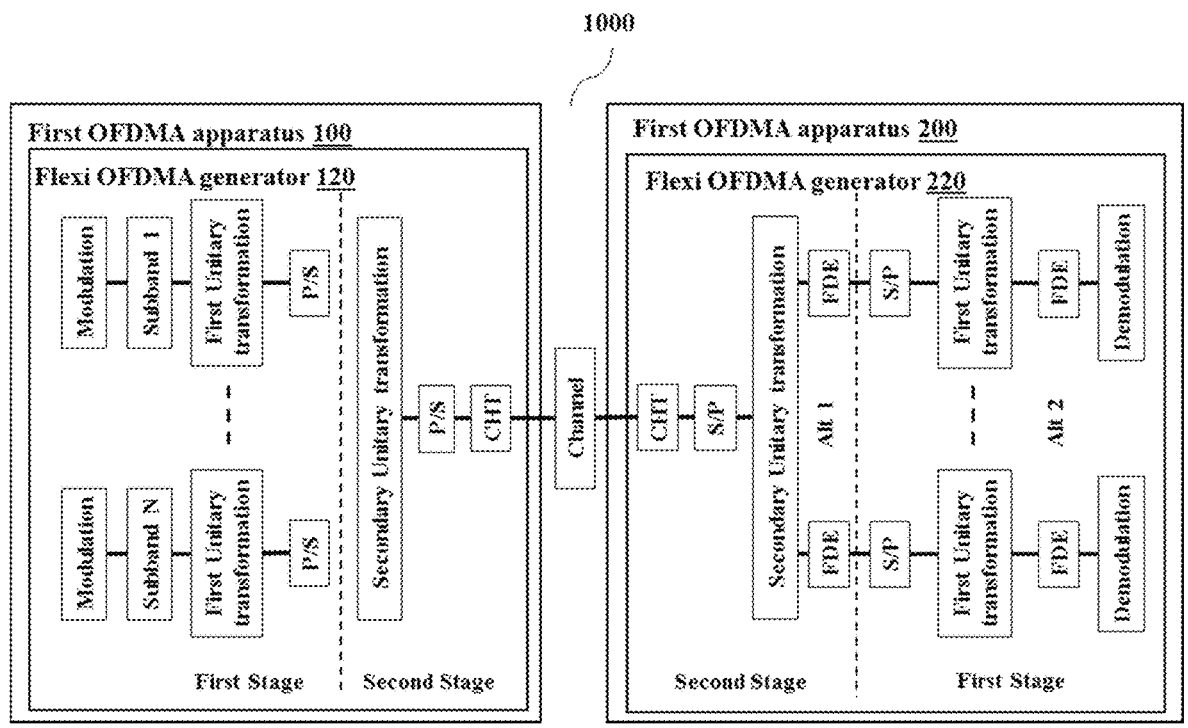
FIG. 1 illustrates a wireless communication system including a first OFDMA apparatus and a second OFDMA apparatus, according to embodiments as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As it is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, embodiments herein provide an OFDMA method for performing an OFDM based communication in a wireless communication system. The OFDMA method includes splitting a carrier bandwidth into a number of subbands. Further, the OFDMA method includes modulating resource units in each of the subbands with data symbols in a parallel manner. Further, the OFDMA method includes multiplexing the resource units by transforming each of the modulated resource units through a plurality of first unitary transformations. Further, the method includes generating a plurality of first OFDM signals by performing a parallel to serial conversion of the transformed resource units. Further, the OFDMA method includes multiplexing samples of at least one OFDM signal from the plurality of first OFDM signals by transforming the samples through a second unitary transformation. Further, the OFDMA method includes generating a second OFDM signal by performing a parallel to serial conversion of the transformed samples. Furthermore, the OFDMA method includes transmitting the second OFDM signal over a wireless channel in the wireless communication system.

Unlike to the conventional methods and systems, the proposed method can be used to obtain a waveform which can multiplex signals with different symbol duration without using any guard band or without applying filtering or windowing to the signal. Therefore, the proposed method can be utilized to provide, spectrally, more efficient compared to the existing waveforms.

Unlike to the conventional methods and systems, the proposed OFDMA apparatus can be used to provide a highly flexible multiplexing capabilities to handle different subcarrier spacing or to support multiple transmit time intervals (TTIs) to a user or group of users to meet different latency requirements.

Unlike to the conventional methods and systems, the proposed OFDMA method can be used to provide an enhanced flexi orthogonal frequency division multiple access technique for Broadband wireless communications. The enhanced flexi orthogonal frequency division multiple access (eflexi-OFDMA) for 5G systems and beyond to support different numerology across smaller subbands of a single larger component carrier bandwidth.

Referring now to the drawings, and more particularly to FIGS. 1 through 21, where similar reference characters denote corresponding features consistently throughout the figures, these are shown preferred embodiments.

FIG. 1 illustrates a wireless communication system 1000 (hereinafter system 1000) including a first OFDMA apparatus 100 and a second OFDMA apparatus 200 with a chain of flexi-OFDMA waveform obtain through a multi stage transformation respectively, according to embodiments as disclosed herein.

In an embodiment, the first OFDMA apparatus 100, and second OFDMA apparatus 200 can be, for e.g., a transmitter, a receiver, a transceiver, an eNodeB (eNb), a base station (BS), a User Equipment (UE), a Mobile station, an electronic device, etc. The first OFDMA apparatus 100 includes a flexi-OFDMA generator 120 configured to split a carrier bandwidth into a number ("N") of subbands. In an embodiment, each of the subband size can be equal/unequal. Further, the flexi-OFDMA generator 120 can be configured to modulate one or more resource units (e.g., a time-frequency grid) in each of the subbands with data symbols in a parallel manner (i.e., by performing a series to parallel conversion using any existing mechanism i.e., serial to parallel converter). In an embodiment, the resource units may depend upon the size of each of the first unitary transformation.

Further, at first stage as depicted, the flexi-OFDMA generator 120 can be configured to multiplex the resource units by transforming each of the modulated resource units through a plurality of first unitary transformations. In an embodiment, the plurality of first unitary transformations can include, for e.g., an Inverse Fast Fourier Transform (IFFT), a Fast Fourier Transform (FFT) and other unitary transformation.

Unlike to the conventional methods and systems, the OFDMA apparatus 100 can be configured to transmit each of the resource units in each subbands using the plurality of first unitary transformations.

Further, the flexi-OFDMA generator 120 can be configured to generate a plurality of first OFDM signals by performing a parallel to serial conversion of the transformed resource units.

For e.g., defining $X_m$ as the input signal at the $m^{th}$ subband $s_{m1}$ as the $1^{st}$ OFDM symbol in the $m^{th}$ band, the output of the first unitary transformations (e.g., output of the stage-1 IFFT) can be written as shown below:

$$s_{ml} = F_{M_m}^\dagger X_m[(l-1)M_m:lM_m-1] = F_{M_m}^\dagger X_{ml}$$

where $F_{M_m}^\dagger$ represents an $M_m$-pt IFFT matrix (i.e., $M_m$-pt first unitary transformations matrix).

Further, at second stage, the flexi-OFDMA generator 120 can be configured to multiplex samples of at least one OFDM signal from the plurality of first OFDM signals by transforming the samples through a second unitary transformation. In an embodiment, the second unitary transformation can include, for e.g., an IFFT, a FFT and other unitary transformation. Further, the flexi-OFDMA generator 120 can be configured to generate the second OFDM signal by performing a parallel to serial conversion of the transformed samples.

For e.g., it is assumed that $M_{max}$ is the maximum IFFT size (i.e., the maximum size of the second unitary transformation) required of all the subbands and any $M_m$ is a divisor of $M_{max}$. This is achieved by having a base subcarrier spacing $f_0$ and other spacing to be a multiple of the base subcarrier spacing i.e., $f_m = kf_0$ where k can be v or $1/v$ or $2^v$ or $\frac{1}{2}^v$, for integer values of v. Now when s is defined as a block of size $N \times M_{max}$ over which the second stage IFFT (i.e., second unitary transformation) operates $M_{max}$ times. With symbol boundaries aligned across all subbands, s and x over the observation window T can be represented as shown below:

$$= \begin{bmatrix} s_{11} & \cdots & s_{1M_{max}/M_1} \\ s_{21} & \cdots & s_{2M_{max}/M_2} \\ & \vdots & \\ s_{N1} & \cdots & s_{NM_{max}/M_N} \end{bmatrix}, \text{ and}$$

$$x = F_N^\dagger s$$

where $F_N^\dagger$ represents an N-pt IFFT matrix. The assumption of any $M_m$ being a divisor of $M_{max}$ is required only to represent at stage-2 (i.e., second stage) transformation as a matrix multiplication. In general, there may be no constraint imposed on the relationship between $M_{max}$ and $M_m$. The representation of s implies that if $M_m < M_{max}$ in the $m^{th}$ subband, the $m^{th}$ row of the blocks can have $M_{max}/M_m$ OFDM symbols.

After performing the parallel to serial conversion, the flexi-OFDMA generator 120 can be configured to transmit vector x over a multipath channel h (i.e., a wireless channel).

In an embodiment, a numerology of each of the unitary transformation from the plurality of first unitary transformations is determined based on the carrier bandwidth and the size of corresponding unitary transformation. In an embodiment, the numerology of the at least one unitary transformation from the plurality of first unitary transformations is multiplexed at the second unitary transformation, where the numerology multiplexed at the second unitary transformation is one of a same numerology, a different numerology and a mixed-numerology.

In yet another embodiment, the flexi-OFDMA generator 120 is generalized in terms of the size of the unitary transformation (i.e., the first unitary transformation and second unitary transformation) used. For the case of the stage two operating at the required subcarrier spacing of numerology, the data from the numerology is given directly to the stage two. The P/S module is generalized as P_in/ P_out with input size of P_in and output size of P_out.

Similarly, the second OFDMA apparatus 200 includes a flexi-OFDMA generator 220 configured to receive the second OFDM signal (i.e., from the first OFDMA apparatus 100). Further, the flexi-OFDMA generator 220 can be configured to perform a serial to parallel conversion of the received second OFDM signal. The serial to parallel conversion can be performed using the serial to parallel converter, any other existing techniques which is known/yet to be known.

Further, the flexi-OFDMA generator 220 can be configured to demultiplex samples of the second OFDM signal by transforming the samples through an inverse of the second unitary transformation. In an embodiment, the second unitary transformation can be, for e.g., an Inverse Fast Fourier Transform (IFFT), a Fast Fourier Transform (FFT) and other unitary transformation.

Further, the flexi-OFDMA generator 220 can be configured to perform a serial to parallel conversion of the transformed samples of the second OFDM signal thereby generating a plurality of second OFDM signals.

Further, the flexi-OFDMA generator 220 can be configured to demultiplex at least one second OFDM signal from the plurality of the second OFDM signals by transforming the at least one second OFDM signal through a plurality of first unitary transformations. In an embodiment, the plurality of first unitary transformations can be, for e.g., IFFT, a FFT and other unitary transformation.

Further, the flexi-OFDMA generator 220 can be configured to obtain data symbols by demodulating the at least one transformed second OFDM signal in a parallel manner.

For e.g., consider the received second OFDM signal at the second stage of the second OFDMA apparatus 200 can be written as shown below:

$$y = H\tilde{s} + n$$

where $$\tilde{s} = [s_{11} \ \cdots \ s_{1M_{max}/M_1}, s_{21} \ \cdots \ s_{NM_{max}/M_N}] \text{ and}$$

$$H = \begin{bmatrix} H(1)I_{M_{max}} & 0 & \cdots & 0 \\ 0 & H(2)I_{M_{max}} & 0 & \vdots \\ \vdots & 0 & \ddots & 0 \\ 0 & \cdots & 0 & H(N)I_{M_{max}} \end{bmatrix}$$

with $H=F_N h$ and $H(i)$ represents the $i^{th}$ element of H. After the N-pt FFT, the estimates of the transmit signal $X_{ml}$ with frequency domain equalization (FDE) either in second stage/ first stage can be written as shown below:

$$\hat{X}_{ml} = W_m H(m) X_{ml} + \hat{n}_m$$

where $W_m$ is the single tap equalizer for the $m^{th}$ subband. The equalizer $W_m$ can be based on MMSE/MRC as in the existing LTE systems. In a special case, where the channel is varying faster than an OFDM symbol duration of a numerology, the second stage channel over those subbands assigned to the numerology are not flat which leads to Inter Carrier Interference (ICI) in the frequency domain signal $X_{ml}$. For this, a Decision Feedback Receiver (DFE) based equalizer can be applied over those subbands in the first stage to get improved performance. For a coded system with a FEC based encoding like Turbo coding, Turbo-DFE can be used to cancel all ICI.

In an embodiment, the flexi-OFDMA generator 120 can be configured to apply a channel handling technique (CHT) to each of the subbands of each of the first OFDM signals before transforming using the plurality of the first unitary transformations.

In another embodiment, the flexi-OFDMA generator 120 can be configured to apply the CHT to a block of OFDM sub-symbols of the second OFDM signal before transforming using the second unitary transformation, and to the resource units before transmitting over the wireless channel.

In an embodiment, the CHT uses at least one of a cyclic prefix removal, zero tail addition, channel estimation, Frequency Domain Equalization (FDE), a customized filter and a window.

In an embodiment, the window is one of a raised cosine (RC), a root raised cosine (RRC) window, and other Nyquist windows.

In an embodiment, the plurality of first OFDM signals can be of same OFDM symbol duration. In another embodiment, the plurality of first OFDM signals can be of a different OFDM symbol duration.

In an embodiment, the samples of the at least one OFDM signal from the plurality of first OFDM signals are sampled at a uniform interval.

In an embodiment, numerology of each of the unitary transformation from the plurality of second unitary transformations is determined based on a carrier bandwidth and a size of corresponding unitary transformation. Further, the numerology is demultiplexed at the first unitary transformation and is one of a same numerology, a different numerology and a mixed-numerology, where the numerology of the at least one unitary transformation from the plurality of second unitary transformations is demultiplexed at the second unitary transformation Throughout the description the first OFDMA apparatus 100 and the OFDMA apparatus 100 can be interchangeably used without departing the scope of the invention. Similarly, the second OFDMA apparatus 200 and the OFDMA apparatus 200 can be interchangeably used without departing the scope of the invention.

Figure 2:
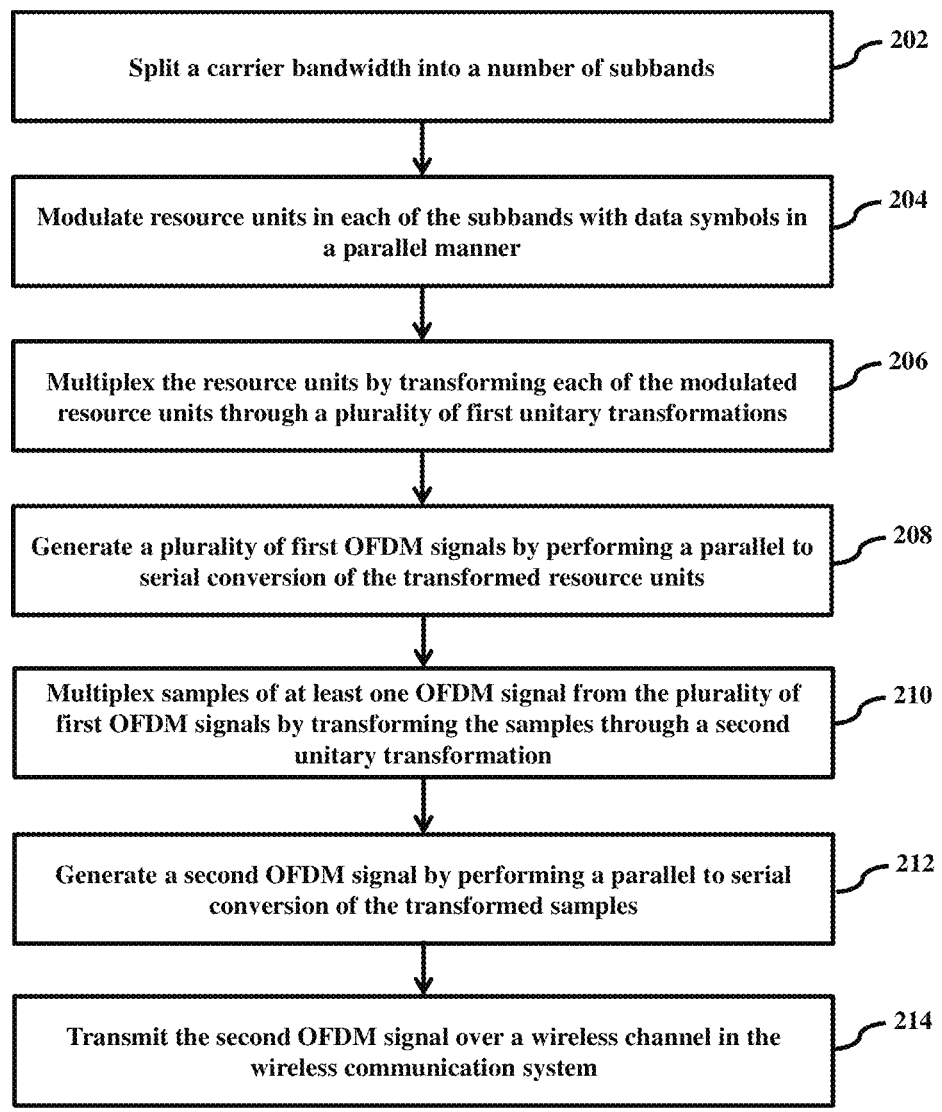
FIG. 2 is a flow diagram illustrating a OFDMA method for transmitting a OFDM signal over a wireless channel, according to an embodiment as disclosed herein.

FIG. 2 is a flow diagram illustrating the OFDMA method for transmitting the OFDM signal over the wireless channel, according to an embodiment as disclosed herein.

At step 202, the method includes splitting the carrier bandwidth into the number of subbands. The method allows the flexi-OFDM generator 120 to split the carrier bandwidth into the number of subbands.

At step 204, the method includes modulating the resource units in each of the subbands with data symbols in the parallel manner. The method allows the flexi-OFDM generator 120 to modulate the resource units in each of the subbands with data symbols in the parallel manner.

At step 206, the method includes multiplexing the resource units by transforming each of the modulated resource units through the plurality of first unitary transformations (as discussed above). The method allows the flexi-OFDMA generator 120 to multiplex the resource units by transforming each of the modulated resource units through the plurality of first unitary transformations.

At step 208, the method includes generating the plurality of first OFDM signals by performing the parallel to serial conversion of the transformed resource units. The method allows the flexi-OFDMA generator 120 to generate the plurality of first OFDM signals by performing the parallel to serial conversion of the transformed resource units.

At step 210, the method includes multiplexing the samples of at least one OFDM signal from the plurality of first OFDM signals by transforming the samples through the second unitary transformation (as discussed above). The method allows the flexi-OFDMA generator 120 to multiplex the samples of at least one OFDM signal from the plurality of first OFDM signals by transforming the samples through the second unitary transformation.

At step 212, the method includes generating the second OFDM signal by performing the parallel to serial conversion of the transformed samples. The method allows the flexi-OFDMA generator 120 to generate the second OFDM signal by performing the parallel to serial conversion of the transformed samples.

At step 214, the method includes transmitting the second OFDM signal over the wireless channel in the system 100. The method allows the flexi-OFDMA generator 120 to transmit the second OFDM signal over the wireless channel in the system 100.

The various actions, acts, blocks, steps, and the like in the flow diagram may be performed in the order presented, in a different order or simultaneously. Further, in some embodiments, some actions, acts, blocks, steps, and the like may be omitted, added, modified, skipped, and the like without departing from the scope of the invention.

Figure 3:
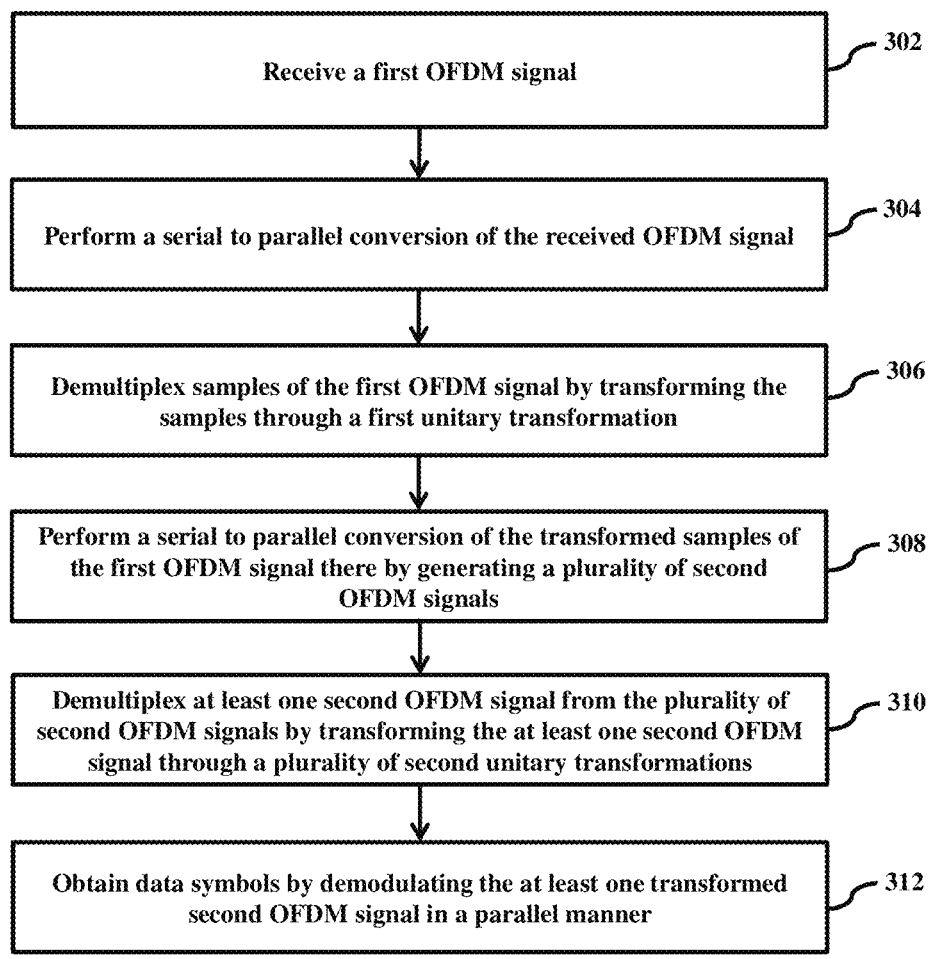
FIG. 3 is a flow diagram illustrating a OFDMA method for receiving a OFDM signal over a wireless channel, according to an embodiment as disclosed herein.

FIG. 3 is a flow diagram illustrating the OFDMA method for receiving the OFDM signal over the wireless channel, according to an embodiment as disclosed herein.

At step 302, the method includes receiving the first OFDM signal. The method allows the flexi-OFDMA generator 220 to receive the first OFDM signal.

At step 304, the method includes performing the serial to parallel conversion of the received OFDM signal. The method allows the flexi-OFDMA generator 220 to perform the serial to parallel conversion of the received OFDM signal.

At step 306, the method includes demultiplexing samples of the first OFDM signal by transforming the samples through the first unitary transformation. The method allows the flexi-OFDMA generator 220 to demultiplex samples of the first OFDM signal by transforming the samples through the first unitary transformation.

At step 308, the method includes performing the serial to parallel conversion of the transformed samples of the first OFDM signal there by generating the plurality of second OFDM signals. The method allows the flexi-OFDMA generator 220 to perform the serial to parallel conversion of the transformed samples of the first OFDM signal there by generating the plurality of second OFDM signals.

At step 310, the method includes demultiplexing at least one second OFDM signal from the plurality of second OFDM signals by transforming the at least one second OFDM signal through the plurality of second unitary transformations. The method allows the flexi-OFDMA generator 220 to demultiplex at least one second OFDM signal from the plurality of second OFDM signals by transforming the at least one second OFDM signal through the plurality of second unitary transformations.

At step 312, the method includes obtaining data symbols by demodulating the at least one transformed second OFDM signal in the parallel manner. The method allows the flexi-OFDMA generator 220 to obtain data symbols by demodulating the at least one transformed second OFDM signal in the parallel manner.

The various actions, acts, blocks, steps, and the like in the flow diagram may be performed in the order presented, in a different order or simultaneously. Further, in some embodiments, some actions, acts, blocks, steps, and the like may be omitted, added, modified, skipped, and the like without departing from the scope of the invention.

Figure 4:
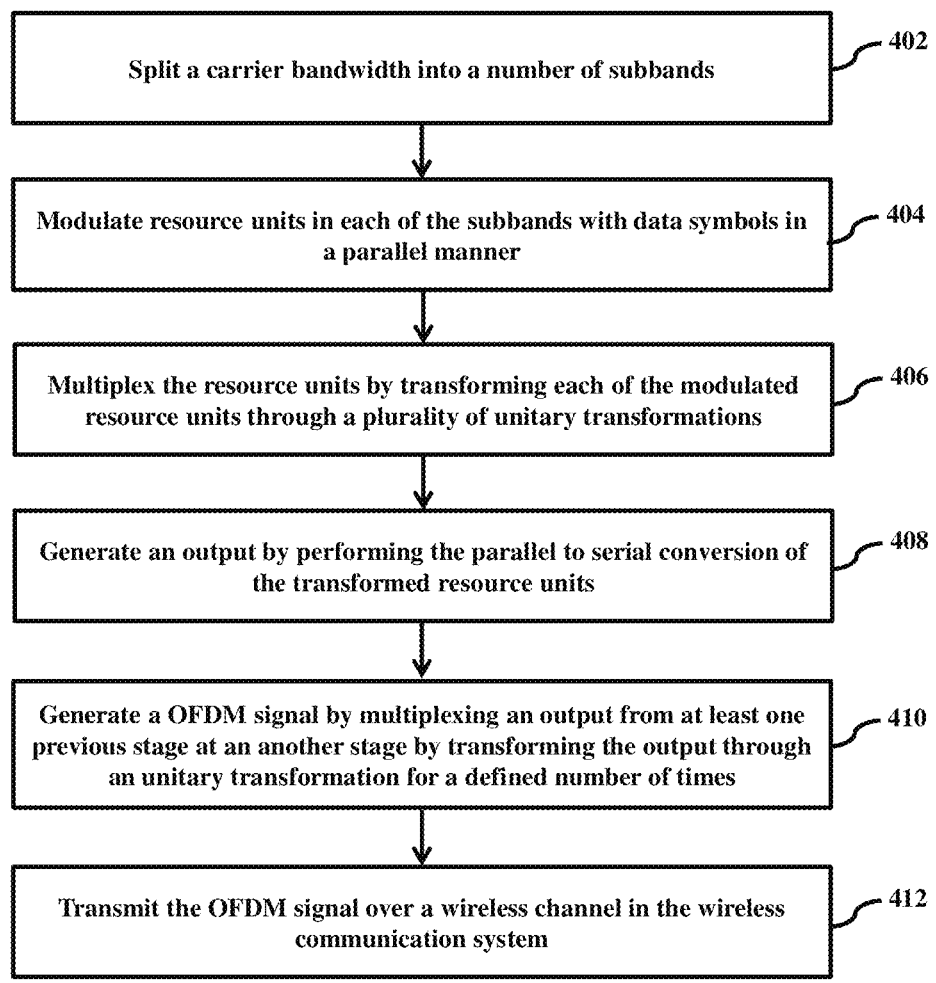
FIG. 4 is a flow diagram illustrating a OFDMA method for transmitting OFDM signal using "N" stages, according to an embodiment as disclosed herein.

FIG. 4 is a flow diagram illustrating the OFDMA method for transmitting OFDM signal using "N" stages, according to an embodiment as disclosed herein.

At step 402, the method includes splitting the carrier bandwidth into the number of subbands. The method allows the flexi-OFDMA generator 120 to split the carrier bandwidth into the number of subbands.

At step 404, the method includes modulating the resource units in each of the subbands with data symbols in the parallel manner. The method allows the flexi-OFDMA generator 120 to modulate the resource units in each of the subbands with data symbols in the parallel manner.

At step 406, the method includes multiplexing the resource units by transforming each of the modulated resource units through the plurality of unitary transformations at a stage. The method allows the flexi-OFDMA generator 120 to multiplex the resource units by transforming each of the modulated resource units through the plurality of unitary transformations at the stage.

At step 408, the method includes generating the output by performing the parallel to serial conversion of the transformed resource units. The method allows the flexi-OFDMA generator 120 to generate the output by performing the parallel to serial conversion of the transformed resource units.

At step 410, the method includes generating the OFDM signal by multiplexing the output from at least one of at least one previous stage at another stage by transforming the output through a unitary transformation for the defined number of times. The method allows the flexi-OFDMA generator 120 to generate the OFDM signal by multiplexing an output from at least one of at least one previous stage at another stage by transforming the output through the unitary transformation for the defined number of times.

At step 412, the method includes transmitting the OFDM signal over the wireless channel in the system 100. The method allows the flexi-OFDMA generator 120 to transmit the OFDM signal over the wireless channel in the system 100.

Figure 5:
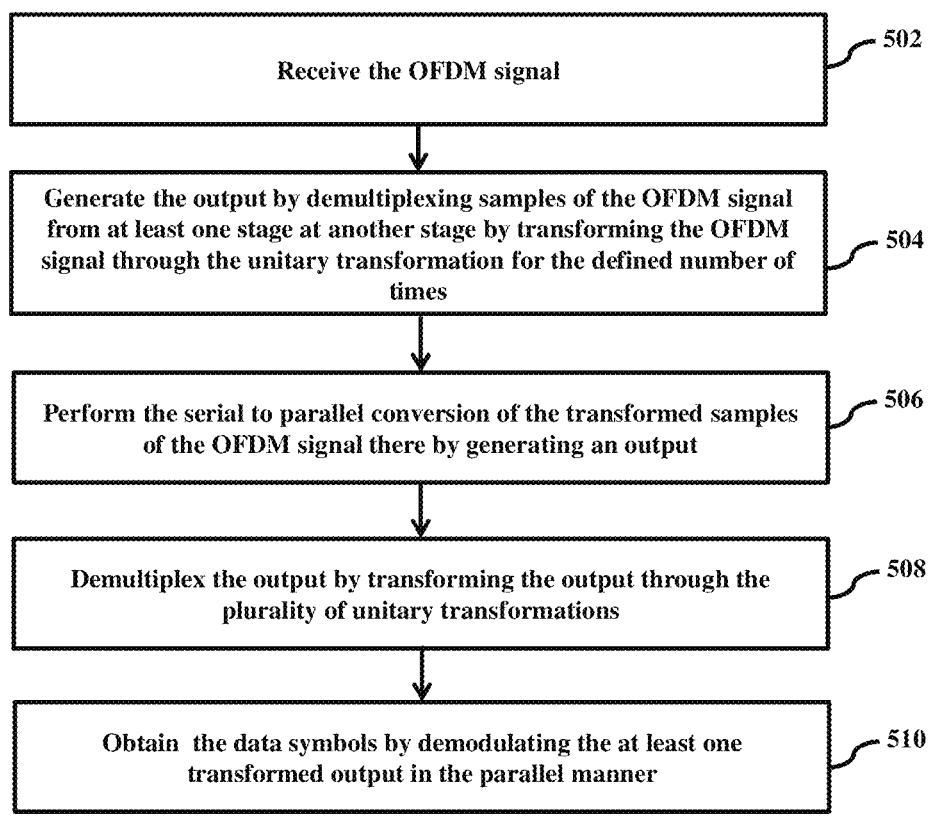
FIG. 5 is a flow diagram illustrating a OFDMA method for receiving a OFDM signal using "N" stages, according to an embodiment as disclosed herein.

FIG. 5 is a flow diagram illustrating the OFDMA method for receiving the OFDM signal using "N" stages, according to an embodiment as disclosed herein.

At step 502, the method includes receiving the OFDM signal. The method allows the flexi-OFDMA generator 220 to receive the OFDM signal.

At step 504, the method includes generating the output by demultiplexing samples of the OFDM signal from at least one stage at another stage by transforming the OFDM signal through the unitary transformation for the defined number of times. The method allows the flexi-OFDMA generator 220 to generate the output by demultiplexing samples of the OFDM signal from at least one stage at another stage by transforming the OFDM signal through the unitary transformation for the defined number of times.

At step 506, the method includes performing the serial to parallel conversion of the transformed samples of the OFDM signal thereby generating the output. The method allows the flexi-OFDMA generator 220 to perform the serial to parallel conversion of the transformed samples of the OFDM signal there by generating the output.

At step 508, the method includes demultiplexing the output by transforming the output through the plurality of unitary transformations. The method allows the flexi-OFDMA generator 220 to demultiplex the output by transforming the output through the plurality of unitary transformations.

At step 510, the method includes obtaining the data symbols by demodulating the at least one transformed output in the parallel manner. The method allows the flexi-OFDMA generator 220 to obtain the data symbols by demodulating the at least one transformed output in the parallel manner.

Figure 6:
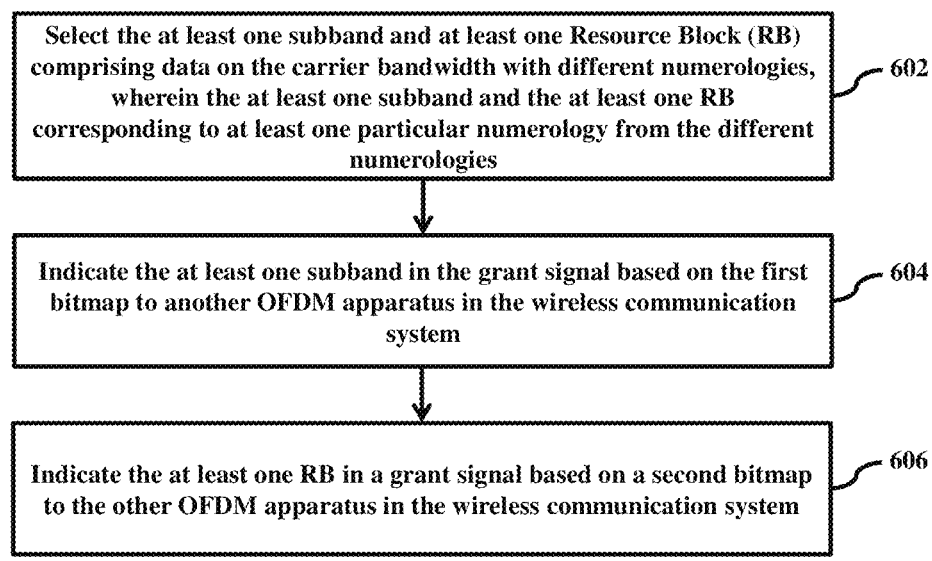
FIG. 6 is a flow diagram illustrating a OFDMA method for providing a grant signaling indication, according to an embodiment as disclosed herein.

FIG. 6 is a flow diagram illustrating the OFDMA method for grant signaling indication, according to an embodiment as disclosed herein.

At step 602, the method includes selecting at least one subband and at least one Resource Block (RB) comprising data on the carrier bandwidth with different numerologies, where the at least one subband and the at least one RB corresponding to at least one particular numerology from the different numerologies. The method allows a mixed-numerology handler to select the at least one subband and at least one RB comprising data on the carrier bandwidth with different numerologies, wherein the at least one subband and the at least one RB corresponding to at least one particular numerology from the different numerologies.

At step 604, the method includes indicating the at least one subband in a grant signal based on a first bitmap to another OFDMA apparatus in the system 1000. The method allows the mixed-numerology handler to indicate the at least one subband in the grant signal based on the first bitmap to another OFDMA apparatus in the wireless communication system.

At step 606, the method includes indicating the at least one RB in a grant signal based on a second bitmap to the other OFDMA apparatus in the system 1000. The method allows the mixed-numerology handler to indicate the at least one RB in the grant signal based on the second bitmap to the other OFDMA apparatus in the wireless communication system.

Figure 7:
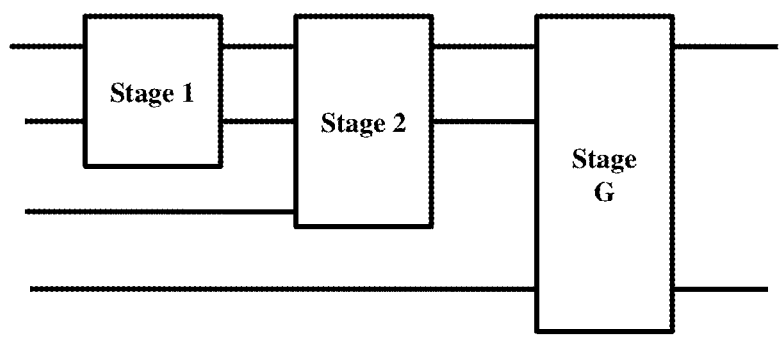
FIG. 7 shows multi stage OFDMA apparatus, according to an embodiment as disclosed herein.

FIG. 7 shows multi stage OFDM apparatus (the first OFDMA apparatus 100 and the second OFDMA apparatus 200), according to an embodiment as disclosed herein. In this case, a set of numerologies are multiplexed up to a stage followed by another numerology multiplexed using a new stage as shown in the FIG. 7.

For e.g., considering the "G" number of stages, the flexi-OFDMA generator 120 can be configured to split a carrier bandwidth into a number of subbands. Further, the flexi-OFDMA generator 120 can be configured modulate resource units in each of the subbands with data symbols in a parallel manner. Further, the flexi-OFDMA generator 120 can be configured to multiplex the resource units by transforming each of the modulated resource units through a plurality of unitary transformations at a stage. Further, the flexi-OFDMA generator 120 can be configured to generate an output by performing a parallel to serial conversion of the transformed resource units. Further, the flexi-OFDMA generator 120 can be configured to generate an OFDM signal by multiplexing an output from at least one of at least one previous stage at another stage by transforming the output through a unitary transformation for a defined number of times. Further, the flexi-OFDMA generator 120 can be configured to transmit the OFDM signal over a wireless channel in the wireless network system.

In an embodiment, multiplexing the output from at least one of at least one previous stage at another stage iteratively by transforming through corresponding unitary transformation for the defined number of times includes: multiplexing the output from at least one previous stage by transforming the output through a unitary transformation at another stage and performing a parallel to serial conversion of the transformed output from the another stage, where the multiplexing and the parallel to serial conversion steps are iterated by providing an output from at least one previous stage at another stage for the defined number of times to generate the OFDM signal.

In an embodiment, the output includes samples of at least one OFDM from at least one of the previous stage. In an embodiment, the at least one OFDM signal is one of a same OFDM symbol duration and a different OFDM symbol duration. In an embodiment, a numerology of each of the unitary transformation in each stage (previous stage and the stage) is determined based on the carrier bandwidth and a size of corresponding unitary transformation Similarly, considering the "G" number of stages, the flexi-OFDMA generator 220 can be configured to receive an OFDM signal. Further, the flexi-OFDMA generator 220 can be configured to generate an output by demultiplexing samples of the OFDM signal from at least one stage at another stage by transforming the OFDM signal through a unitary transformation for a defined number of times. Further, the flexi-OFDMA generator 220 can be configured to perform a serial to parallel conversion of the transformed samples of the OFDM signal thereby generating an output. Further, the flexi-OFDMA generator 220 can be configured to demultiplex the output by transforming the output through a plurality of unitary transformations, and obtain data symbols by demodulating the at least one transformed output in a parallel manner.

In an embodiment, demultiplexing samples of the OFDM signal from one stage at another stage by transforming the OFDM signal through the unitary transformation for the defined number of times includes: demultiplex the samples of the OFDM signal from one stage by transforming the output through a unitary transformation at an another stage, and perform a parallel to serial conversion of the transformed OFDM signal from the another stage, where the demultiplexing and the parallel to serial conversion steps are iterated by providing an output from at least one previous stage at another stage for the defined number of times to generate the output.

Unlike to the conventional methods and system, the proposed method allows the OFDMA apparatus 100/200 to seamlessly multiplex different numerologies (mixed numerologies) without guard band or guard time. The mixed numerology scenario is where one or more bands from the OFDMA apparatus are given to a particular numerology over certain period. The rate at any instant in band m defines the subcarrier spacing $\Delta f_m$ and the FFT size $M_m$. Defining T as the observation duration of all numerologies, the following sections depict the multiplexing of different numerologies over time and frequency.

Figure 8A:
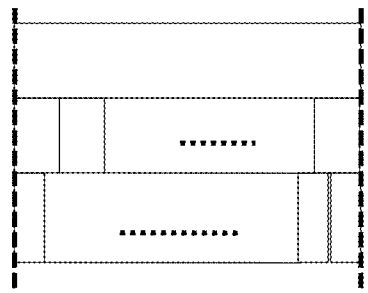
FIGS. 8A-8B show multiplexing with symbol boundary alignment and without symbol boundary alignment, according to an embodiment as disclosed herein.
Figure 8B:
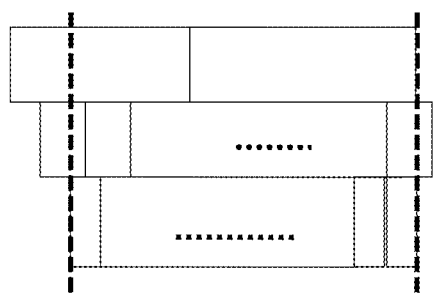

FIGS. 8A-8B shows multiplexing with symbol boundary alignment and without symbol boundary alignment respectively, according to an embodiment as disclosed herein.

Multiplexing different numerologies over frequency is achieved by allocating different numerology in different bands of the OFDMA apparatus. Within the base observation window T, each of the numerology can have multiple symbols, as shown in the FIG. 8A. The FIG. 8A represents the case of all the subcarrier spacing being a multiple of base subcarrier spacing and the subframe durations is again a divisor of the base subframe duration. In this scenario, the symbol boundaries of all numerologies are aligned over a common observation window. For the case where the subcarrier spacing are not integer multiples of a base subcarrier spacing and the subframe durations are not divisors of a base subframe duration, the eflexi-OFDM symbols are not aligned as shown in the FIG. 8B.

Figure 9:
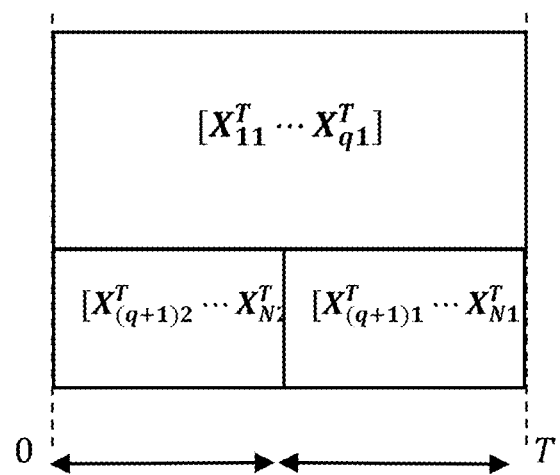
FIG. 9 shows frequency domain subframe of a mixed numerology, according to an embodiment as disclosed herein.

FIG. 9 shows frequency domain subframe of the mixed numerology, according to an embodiment as disclosed herein.

Considering an example of two numerologies with q of the subbands allocated to numerology 1 and N–q to numerology 2 over time period T. Now if $f_0=1/T$ and $f_2=2f_0$ are subcarrier spacing for each numerologies respectively, the frequency domain subframe of the mixed numerology can be formed as shown in the FIG. 9.

Figure 10:
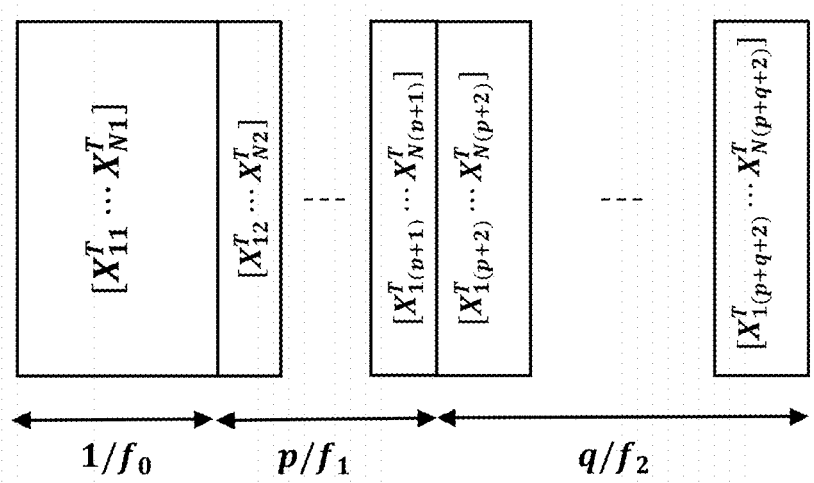
FIG. 10 shows a time multiplexing, according to an embodiment as disclosed herein.

FIG. 10 shows Time multiplexing, according to an embodiment as disclosed herein.

Similarly time multiplexing over duration T is done using the assumption of each of the numerology occupying the entire carrier bandwidth but over a limited duration. This is depicted in the FIG. 10 using three numerologies given 1, p and r eflexi-OFDM symbols respectively.

Figure 11:
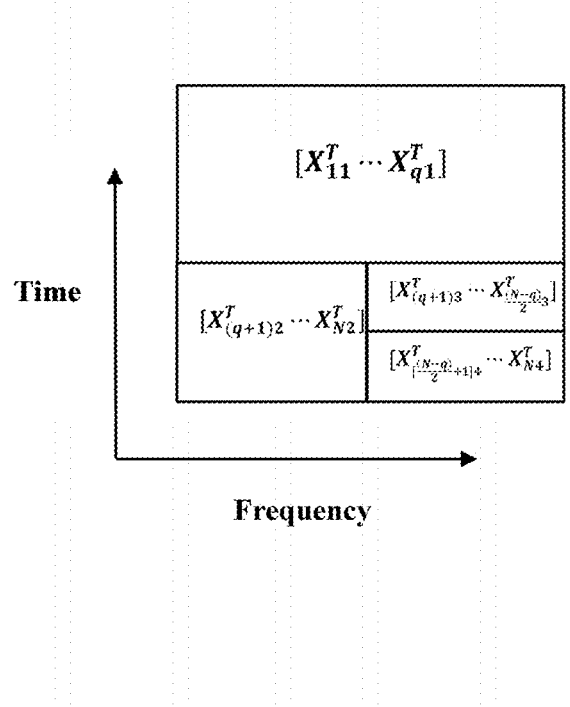
FIG. 11 shows a Time-Frequency multiplexing, according to an embodiment as disclosed herein.

FIG. 11 shows Time-Frequency multiplexing, according to an embodiment as disclosed herein.

For e.g., each numerology occupy certain time-frequency resource within the observation time T. The FIG. 11 depicts the case of 3 numerologies with the assumption of $f_0=1/T$, $f_1=2f_0$ and $f_2=3f_0$ multiplexed over in both time and frequency. As depicted in the FIG. 10, after a duration of /2, the subbands are assigned to the numerology with subcarrier spacing $f_2$. In this instant the stage-1 IFFT/FFT size corresponding to the bands q+1 to N are changed according to the assigned subcarrier spacing.

Figure 12:
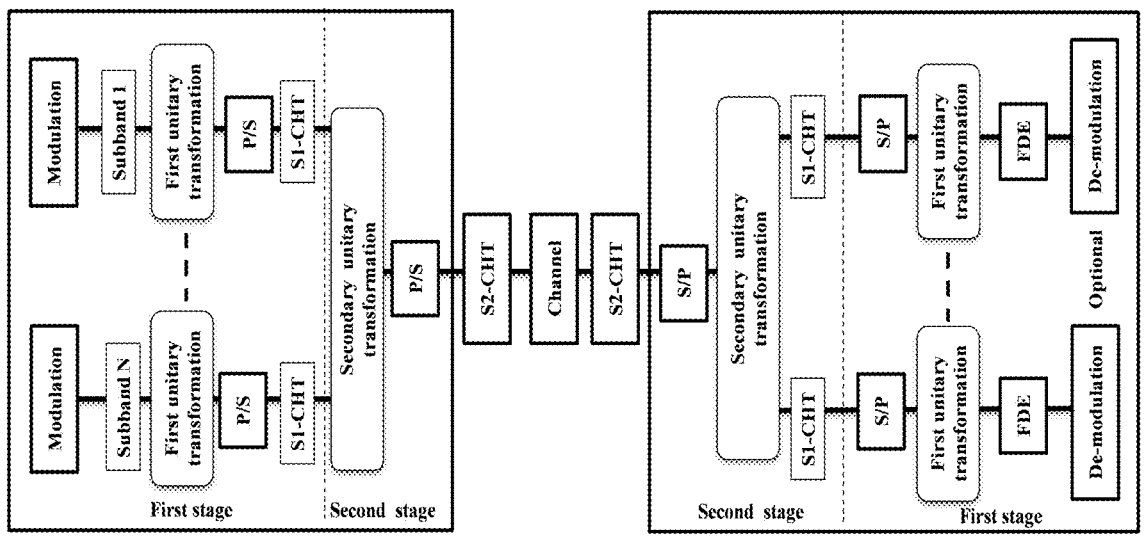
FIG. 12 is a 2-stage OFDMA apparatus structure with single transceiver chain, according to an embodiment as disclosed herein.

FIG. 12 is a 2-stage OFDMA apparatus 100/200 structure with single transceiver chain, according to an embodiment as disclosed herein.

For e.g., different channel handling techniques (CHT) can be incorporated in the OFDMA apparatus 100/200 to counter the multipath channel. Defining the stage-1, OFDMA apparatus 100, output as the eflexi-OFDMA symbol and stage-2, OFDMA apparatus 100, output as the eflexi-OFDMA sub-symbol, any CHT can be applied at stage-1 on each symbol or over a block of sub-symbols at stage-2 with the block length as low as one. In the stage-1, the CHT is applied over individual subband or a set of subbands. The CHT can also be applied on both stage-1 and stage-2. The CHT used over each subband can be decided based on different parameters like delay spread, Doppler spread, allocation bandwidth etc.

Generally, the CHT is classified as the OFDMA apparatus 100/200 process. The OFDMA apparatus 100 process includes for e.g., adding the CP, the zero tail (ZT), the KS, etc. Further, applying a filtering or windowing at the OFDMA apparatus 100 is also considered as the CHT process. Similarly, the OFDMA apparatus 200 process includes, for e.g., manipulation of the CP/ZT/KS aiding to multipath channel equalization, applying a filtering, or windowing over the received signal. The system shown in the FIG. 1 is the simplest form of the eflexi-OFDMA apparatus, where the CHT is applied at stage-2 output of the OFDMA apparatus 100 and at the stage-2 input of the OFDMA apparatus 200.

In an embodiment, windowing used as a part of the CHT can be a raised cosine (RC) or a root raised cosine (RRC) window or any other window. When RRC windowing is used, by proper allocation of numerologies, zero or nearly zero OOBE to adjacent numerologies can be ensured.

Figure 13:
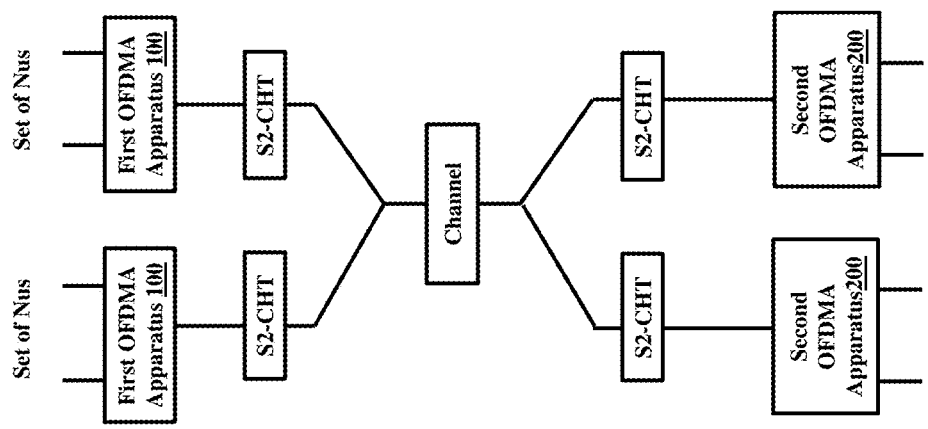
FIG. 13 illustrates a structure of the OFDMA apparatus with multiple transceiver chains, according to an embodiment as disclosed herein.

FIG. 13 illustrates a structure of the OFDMA apparatus 100/200 with multiple transceiver chains, according to an embodiment as disclosed herein.

Referring to the FIG. 13, more generalized version of FIG. 12 can be seen as the case of the stage 2 CHT OFDMA apparatus 100 and OFDMA apparatus 200 being different for different set of numerologies. This is represented in the FIG. 13 where there are multiple eflexi-OFDMA chains to support different stage 2 CHT FDMA apparatus 100 and OFDMA apparatus 200.

Figure 14:
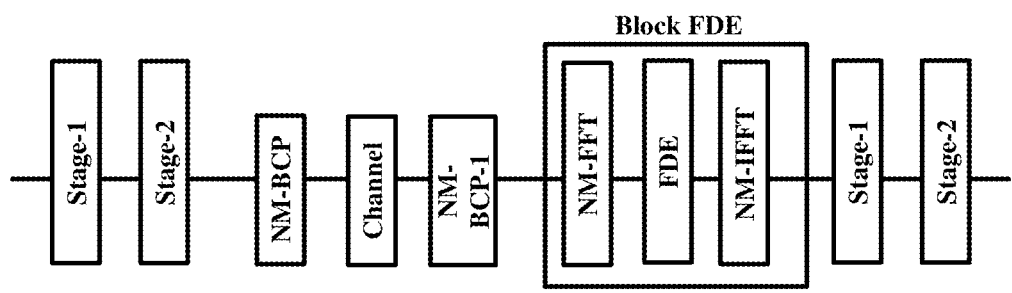
FIG. 14 illustrates the OFDMA apparatus with BCP and block FDE, according to an embodiment as disclosed herein.

FIG. 14 illustrates the OFDMA apparatus 100/200 with BCP and block FDE, according to an embodiment as disclosed herein.

Referring to the FIG. 14, the CP can be used by the OFDMA apparatus 100/200 to counteract the multipath channel. This is achieved by repeating a predetermined portion of time domain data from the end of the OFDM symbol to the starting. This makes the channel circularly convolved with the OFDM symbol making it diagonalizable under IFFT-FFT pair (i.e., the first unitary transformation and the second unitary transformation). The length of the CP is determined by the delay spread of the channel response. The CP can be incorporated in the OFDM apparatus 100/200 either in symbol level or sub-symbol level. The sub-symbol level CP is handled as a part of S2 CHT Tx-Rx scheme. A block CP (BCP) where CP is added every block of particular length is also covered under the CHT. The BCP can be added either in stage 1 or stage 2 or a combination of both. For e.g., consider a special case where the block length is the same as the OFDM symbol duration of any numerology, to which the BCP acts as a symbol level CP.

Further, a processing for the symbol level CP in the OFDMA apparatus 200 can be performed by removing the CP from the received symbol and performing FFT operation. In eflexi-OFDM apparatus 200 this is true for the stage-2 CP at sub-symbol level. For BCP or symbol level CP, the OFDM apparatus 200 processing can be done by taking a bigger point FFT of size block length multiplied by stage-2 FFT size. After the FFT, a block level single tap frequency domain equalization (FDE) is performed over each data followed by the bigger point IFFT, as shown in the FIG. 14. The channel knowledge required to perform the block FDE is acquired by transmitting the known sequence (KS) as a part of the stage-1/stage-2 processing of the first OFDM apparatus 100.

Figure 15:
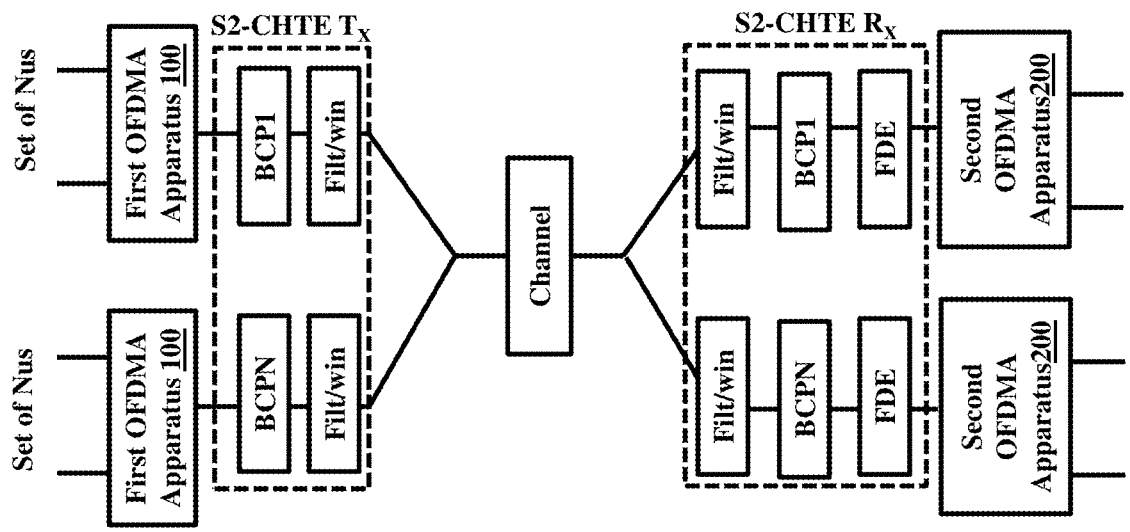
FIG. 15 illustrates a structure of the OFDMA apparatus with multiple BCP, according to an embodiment as disclosed herein.

FIG. 15 illustrates a structure of the OFDMA apparatus 100/200 with multiple BCP, according to an embodiment as disclosed herein.

Unlike to the conventional methods and systems, if the BCP requirement is different for different set of numerologies, then BCP is added over multiple OFDMA apparatus 100 chain and processed using multiple OFDM apparatus 200 chain.

Further, for e.g., to avoid INI, appropriate filtering or windowing is included in the S2-CHT OFDMA apparatus 100 and OFDMA apparatus 200 blocks.

Variants of Flexi-OFDMA 100/200

The Flexi-OFDMA apparatus 100/200 requires no guard band to avoid Inter-Numerology-Interference (INI), still filtering and windowing of the time domain signal can be beneficial to suppress OOBE and thus suppress Adjacent Carrier Interference (ACI). Similarly flexible CP addition to each numerology is possible in Flexi-OFDMA apparatus 100/200 with appropriate filtering/windowing. Following variants are possible in Flexi-OFDMA apparatus 100/200 to reduce PAPR and/or OOBE and to allow flexible CP.

Time Domain Windowing/Filtering

Figure 16A:
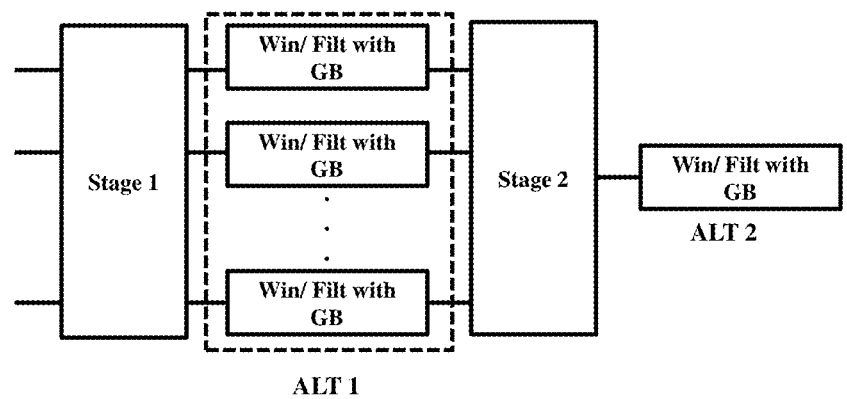
FIGS. 16A-F illustrate various filtering/windowing arrangements applied in Flexi-OFDMA, according to an embodiment as disclosed herein.

FIG. 16A illustrates a time domain windowing/filtering applied to the Flexi-OFDMA apparatus 100/200, according to an embodiment as disclosed herein.

Referring to the FIG. 16A, filtering/windowing in Flexi-OFDMA 100/200 can be applied either at the output of stage-1/stage-2, where each subband can have a filter/window applied over each time domain OFDM symbol. This allows customized filters for each band with different requirement. Alternatively the windowing/filtering function could be performed at the output of stage 2. This has lesser complexity with respect to the previous alternative, but has its limitations as well. The guard time (GT) required for the filter/window at any stage is added appropriately.

Figure 16B:
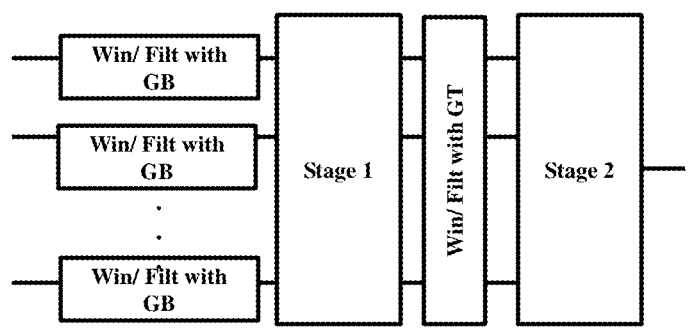

FIG. 16B illustrates a Frequency domain windowing/filtering applied to the flexi-OFDMA apparatus 100/200, according to an embodiment as disclosed herein.

This is similar to the FIG. 16A, with the filter/window applied over frequency domain. Thus, there are two alternatives where the filter/window is applied every subband at the stage-1 input, with better flexibility at the cost of complexity. Alternatively the process could be done at the stage-2 input over the entire bandwidth with lesser complexity. The guard band (GB) required to allow the transition of each subband or the entire carrier is easily added along with the filter/windowing module.

Figure 16C:
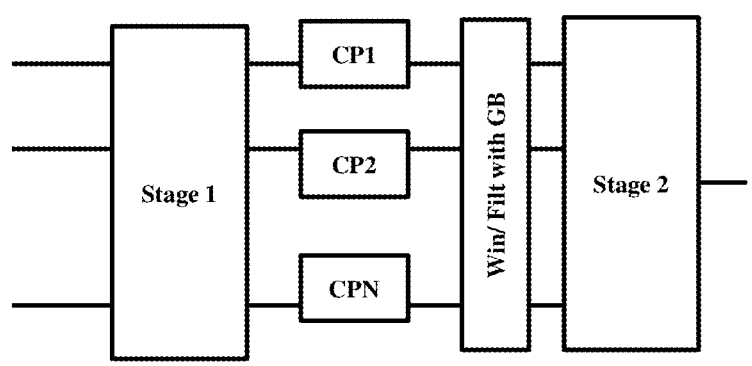

FIG. 16C illustrates a dynamic CP addition at the Flexi-OFDMA apparatus 100/200, according to an embodiment as disclosed herein.

Given proper filters are available in time/frequency domain of flexi-OFDMA to suppress INI, the CP added in stage-2 can be moved to stage-1 this gives better flexibility to the scheme by adding CP to stage 1 instead of stage 2. This gives better flexibility in having dynamic CP length across numerologies/UEs. In this case, the stage 1 transformations happen over the numerology level instead of subband level.

Figure 16D:
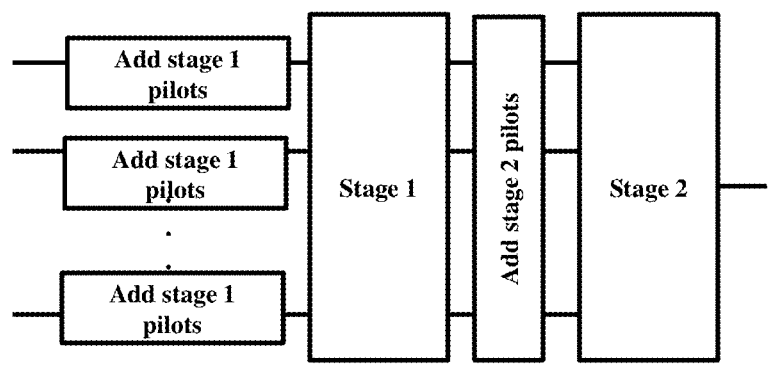
Figure 16E:
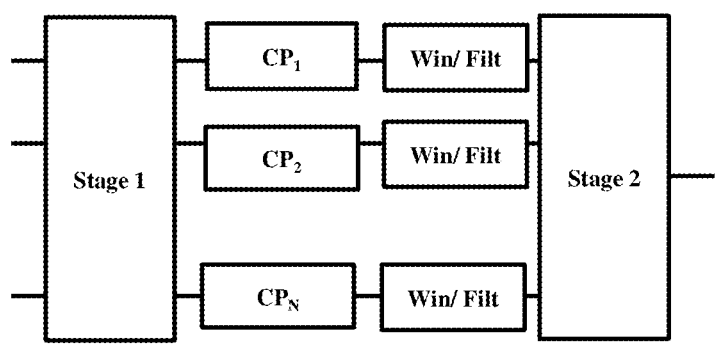
Figure 16F:
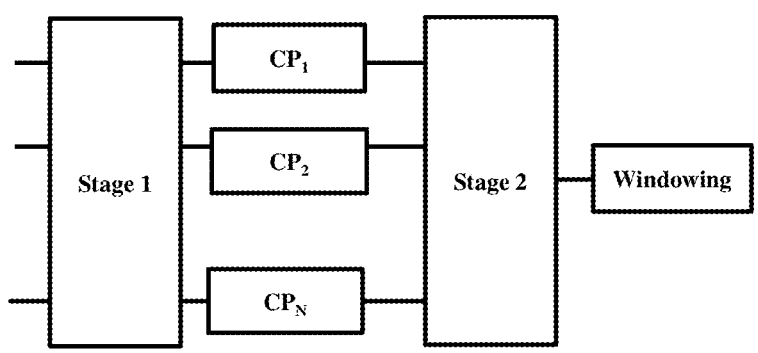

FIG. 16D illustrates a pilot design applied to the Flexi-OFDMA apparatus 100/200, according to an embodiment as disclosed herein.

Figure 17:
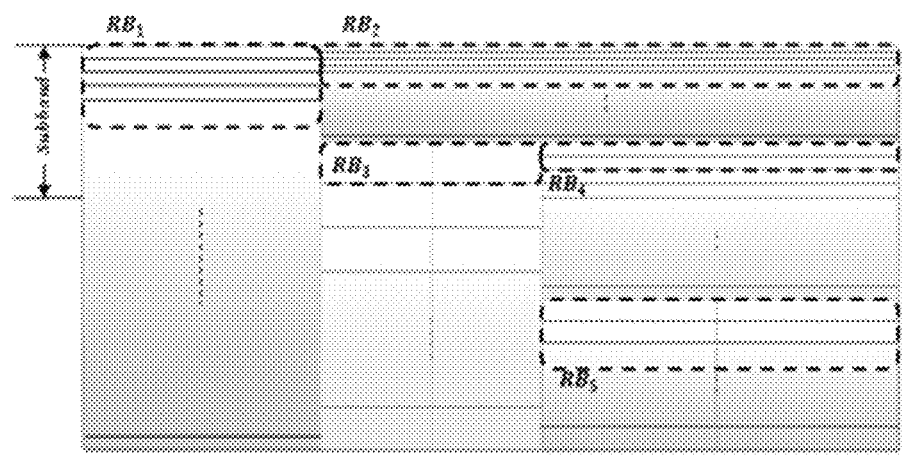
FIG. 17 illustrates a NRAT frame structure with different Resource Block (RB) definitions, according to an embodiment as disclosed herein.

Unlike the existing OFDMA based systems, Flexi-OFDMA 100/200 could have two stage pilot design. With pilots having different purposes from positioning, demodulation, CSI measurement etc., density of pilots vary based on the purpose. Also UE specific pilots could have different precoders to maintain orthogonal sequences. The two stage pilot design gives the flexibility to add pilots with different purposed in different stages. This helps in better resource utilization in the transmitter and also reduces the complexity in the receiver. Estimation in the receiver happens to different pilots in different stages. For example, a low doppler user could have stage 2 pilot transmission and FDE in the receiver which requires lesser pilot density and lower complexity of estimation and equalization. On the other hand, a high doppler user who need a DFE-FDE will do pilot transmission and equalization in stage 1. Thus each type of pilot is designed specifically for a stage, which provides better pilot design and reduces pilot overhead FIG. 17 illustrates a NRAT Frame Structure with different RB definitions, according to an embodiment as disclosed herein.

In an embodiment, the OFDMA apparatus 100/200 can be configured to select at least one subband and at least one Resource Block (RB) comprising data on a carrier bandwidth with different numerologies, where the at least one subband and the at least one RB corresponding to at least one particular numerology from the different numerologies.

For e.g., the unified frame structure of the NRAT will contain multiple numerologies spanning over orthogonal time-frequency grids. The frame structure of the NRAT can be represented as shown in the FIG. 17. The notion of resource block (RB) in NRAT is specific to a numerology spanning over $$\frac{J_0}{c}$$

subcarriers and $$\frac{L_0}{d}$$

symbols, where $J_0 \times L_0$ is the resource indication size common for all numerology with c and d are integer divisors of $J_0$ and $L_0$, respectively. Thus, each of the numerology has different RB size as minimum allocation with different number of subcarriers and symbols. Thus, providing a better granularity in scheduling with better resource utilization. The number of subcarriers per RB could be as low as 1 making it a single carrier transmission in each RB. For a special case c and d can be the same.

In another embodiment, the notion of RB in NRAT over $$\frac{J_0}{c}$$

subcarriers and $$\frac{L_0}{d}$$

symbols is same for all numerologies, where $J_0 \times L_0$ is the resource indication size common for all numerologies with c and d are integer divisors of $J_0$ and $L_0$, respectively. Unlike to conventional methods and system, where the values of c and d may be different for different numerologies, in the proposed method the values of c and dare same and are fixed. Thus, providing a better granularity in scheduling with better resource utilization.

Figure 18:
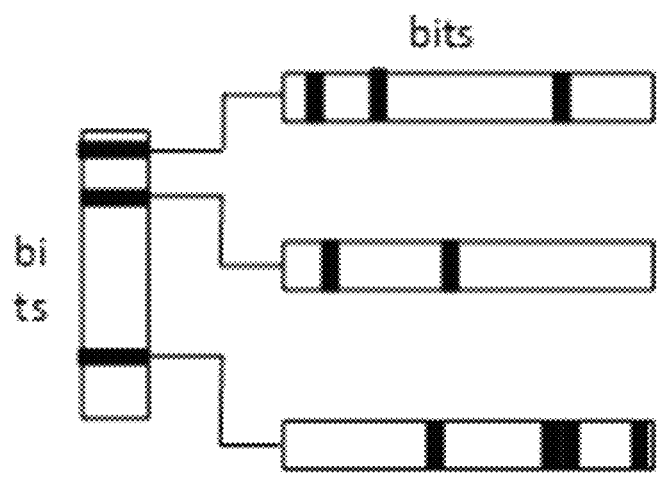
FIG. 18 illustrates a Bit map for grant signalling, according to an embodiment as disclosed herein.

FIG. 18 illustrates shows a Bit map for grant signalling, according to an embodiment as disclosed herein.

The OFDMA apparatus 100/200 can be configured to indicate the at least one subband in a grant signal based on a first bitmap to another OFDMA apparatus (not shown) in the system 300. Further, the OFDMA apparatus 100/200 can be configured to indicate the at least one RB in a grant signal based on a second bitmap to the other OFDM apparatus in the system 300.

Unlike to conventional systems and methods, where scheduling of resources for users is performed depending on the data rate requirement of the users. Resource allocation can be performed on different numerologies depending on the latency and other requirements. With different numerologies having different RB size, signaling of the grant during communication results in increased overhead. Thus, the propose method can allow a two-level grant indication, where the allocation of each OFDMA apparatus 100/200 within numerology is indicated using two levels namely subband allocation and RB allocation.

The subband allocation is common for all numerologies and the RB allocation is specific to the numerology. With "N" subbands and a maximum of "Q" RBs within any numerology, the bitmap required to indicate an RB allocation can be represented as shown in the FIG. 18.

Figure 19:
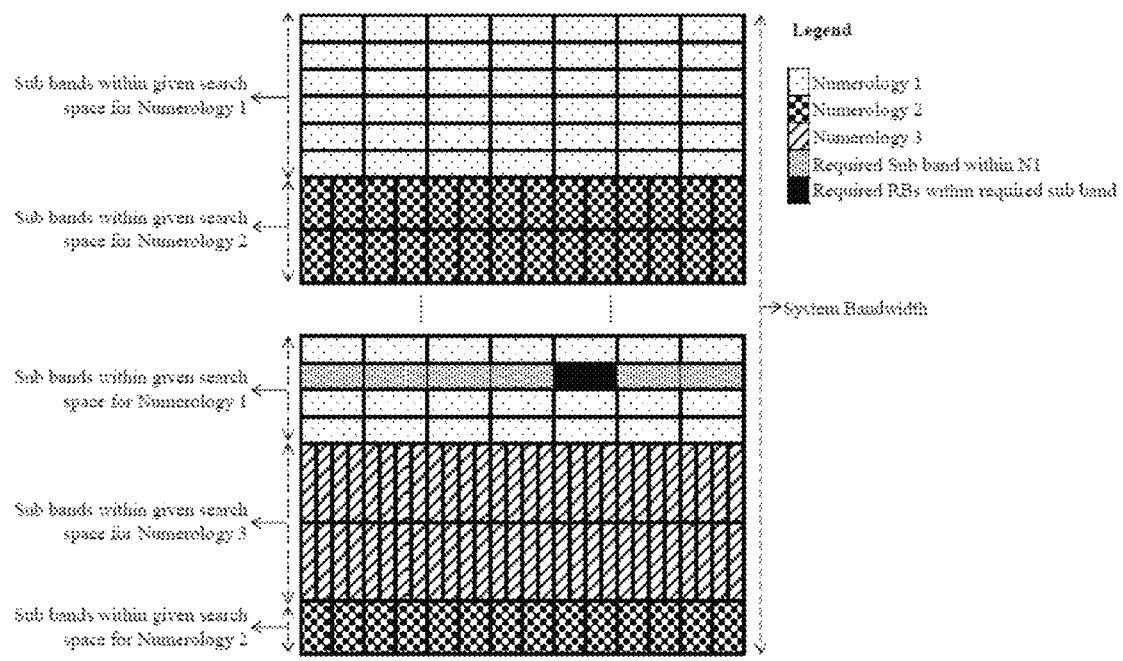
FIG. 19 is an example illustration of subbands allocated for each numerology, according to an embodiment as disclosed herein.

FIG. 19 is an example illustration of Subbands allocated for each numerology, according to an embodiment as disclosed herein.

For e.g., there can be multiple such sub bands within the said numerology. Multiple UEs can be scheduled within the same sub band. The sub band allocation is common for all numerologies and the RB allocation is specific to the numerology. This implies that there is a common notion of sub band across all numerologies and each numerology has integer number of RBs within the sub band with the RBs properly aligned. This is shown in the FIG. 19, where each sub band is given to a numerology containing different numbers. This is represented with each shade representing a numerology with different number of RBs in a subband.

Figure 20A:
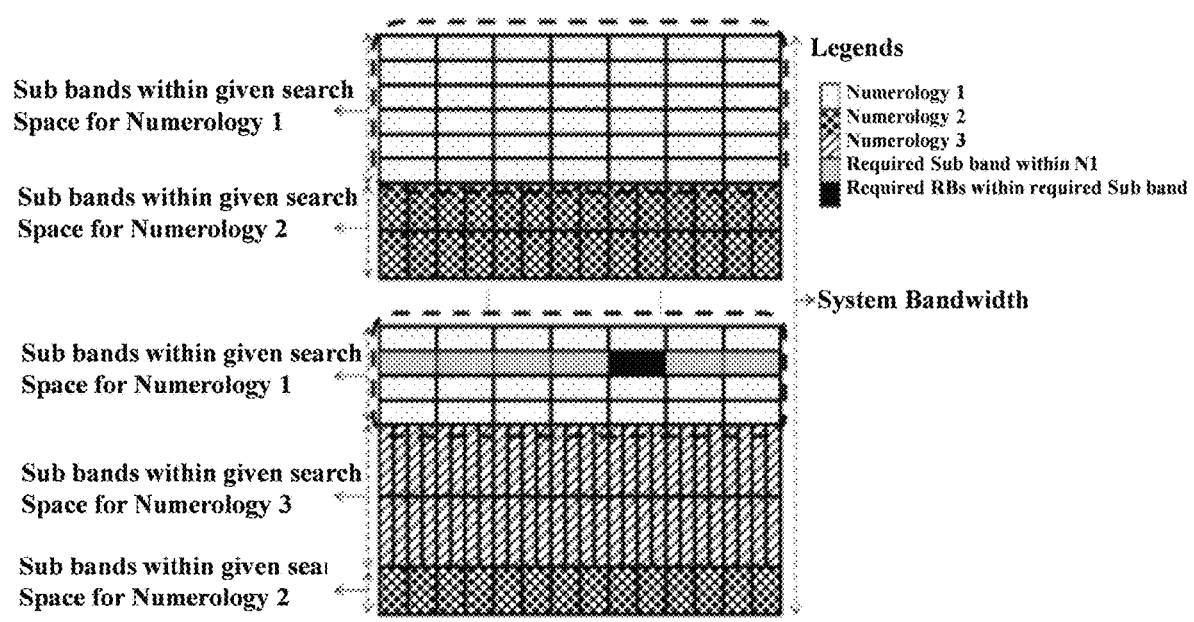
FIG. 20A illustrates a subband allocation in which "N" indicates all the sub bands allocated to numerology 1 (depicted in dotted lines), according to an embodiment as disclosed herein.

FIG. 20A illustrates a subband allocation in which "N" indicates all the sub bands allocated to numerology 1 (depicted in dotted lines), according to an embodiment as disclosed herein.

Referring to the FIG. 20A, "N" indicates all the sub bands allocated to a given numerology and "Q" indicates a set of RBs which contain the actual grant allocation/data within the said sub bands.

Figure 20B:
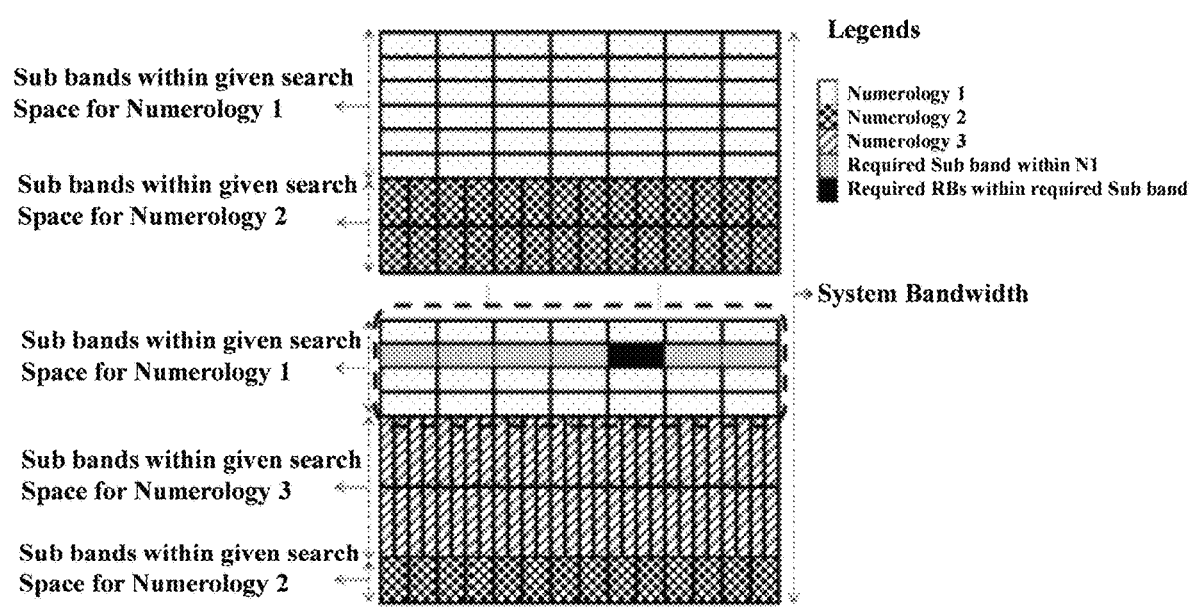
FIG. 20B illustrates a subband allocation in which "N" indicates the search space corresponding to a set of sub bands of numerology 1 (depicted in dotted lines), according to an embodiment as disclosed herein.

FIG. 20B illustrates a subband allocation in which "N" indicates the search space corresponding to a set of sub bands of numerology 1 (depicted in dotted lines), according to an embodiment as disclosed herein.

Referring to the FIG. 20B, "N" indicates a set of sub bands corresponding to a search space. The search space is a set of sub bands to be scanned by the UE to find its grant information. There can be multiple such search spaces across the bandwidth. "Q" indicates a set of RBs which contain the actual grant allocation/data over the desired bandwidth.

Figure 20C:
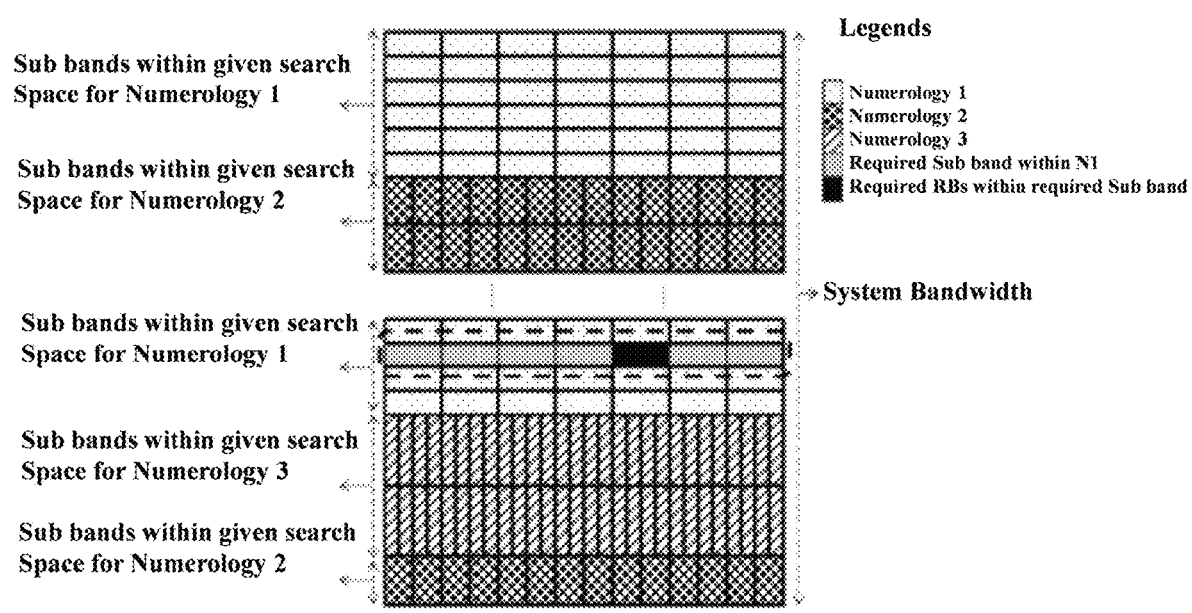
FIG. 20C illustrates a subband allocation in which "N" indicates the search space corresponding to a set of sub bands of numerology 1 (depicted in dotted lines), according to an embodiment as disclosed herein.

FIG. 20C illustrates a subband allocation in which "N" indicates the search space corresponding to a set of sub bands of numerology 1 (depicted in dotted lines), according to an embodiment as disclosed herein.

Referring to the FIG. 20C, "N" indicates the exact sub bands containing the data. "Q" indicates the exact RBs which contain the actual grant allocation/data within the said sub bands.

For e.g., the N sub bands and Q RBs can be represented using any combination of bits, which uniquely identifies the grant allocation. This can be represented in the following methods
  i) Indices represents at least one of sub bands and RBs
  ii) Bit map indicates at least one of the positions of the sub bands and RBs
  iii) Mix of bitmap and indices representation
  iv) Combination of a set of sub bands and RBs
  v) Numbering can be in at least one of ascending, descending and any random order known to base station and UE
  vi) Instructions to derive the positions of at least one of the sub bands and/or RBs.

Figure 21:
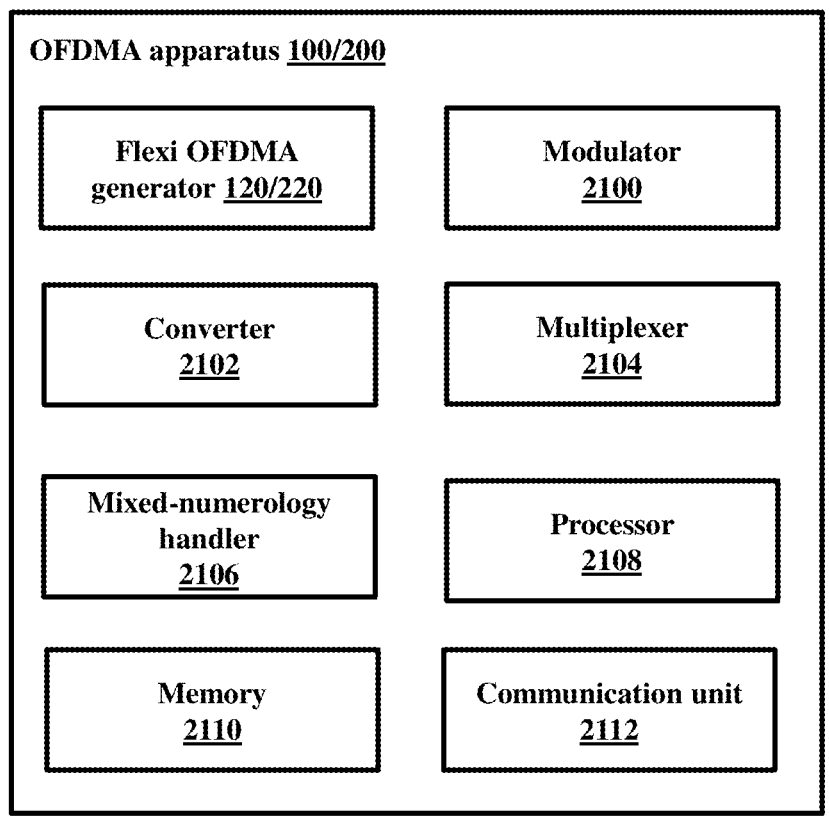
FIG. 21 illustrates various hardware elements of the OFDMA apparatus, according to an embodiment as disclosed herein.

FIG. 21 illustrates various hardware elements of the OFDM apparatus 100/200, according to an embodiment as disclosed herein.

Referring to the FIG. 21, the OFDM apparatus 100/200 includes the flexi-OFDMA generator 120/220, a modulator 2100, a converter 2102, and a multiplexer 2104, a de-multiplexer 2106, a mixed numerology handler 2108, a grant signaling unit 2110, a processor 2112, a memory 2114, and a communication unit 2116.

The operations of the flexi-OFDMA generator 120/220 are detailed above in the FIG. 1. The modulator 2100 can be configured to modulate the resource units. In another embodiment, the flexi-OFDMA generator 120 can communicate with the modulator 2100 to receive the modulated resource units. In yet another embodiment, the flexi-OFDMA generator 120 can be configured to perform the operations of the modulator 2100. The converter 2102 can be configured to convert signals (e.g., OFDM signals, output signal, etc.). The converter 2102 can be, for e.g., parallel to serial converter/serial to parallel converter. In another embodiment, the flexi-OFDMA generator 120/220 can communicate with the converter 2102 to convert the signals. In yet another embodiment, the flexi-OFDMA generator 120/220 can be configured to perform the operations of the converter 2102. The multiplexer 2104 can be configured to multiplex the resource units/samples of the at least OFDM signal from the plurality of the first OFDM signals. In another embodiment, the flexi-OFDMA generator 120 can communicate with the multiplexer 2104 to multiplex the resource units/samples of the at least OFDM signal from the plurality of the first OFDM signals. In yet another embodiment, the flexi-OFDMA generator 120/220 can be configured to perform the operations of the multiplexer 2104.

In an embodiment, the de-multiplexer 2106 can be configured to demultiplex the samples of the first OFDM signal/demultiplex at least one second OFDM signals. In another embodiment, the flexi-OFDMA generator 220 can communicate with the de-multiplexer 2106 to demultiplex the samples of the first OFDM signal/demultiplex at least one second OFDM signals. In yet another embodiment, the flexi-OFDMA generator 220 can be configured to perform the operations of the de-multiplexer 2106.

In an embodiment, the operations of the mixed numerology handler 2108 is detailed in the FIGS. 17-18.

The memory 2110 may include one or more computer-readable storage media. The memory 2110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 2110 may, in some examples, be considered a non-transitory storage medium. The term "non-transitory" may indicate that the storage medium is not embodied in a carrier wave or a propagated signal. However, the term "non-transitory" should not be interpreted to mean that the memory 2110 is non-movable. In some examples, the memory 2110 can be configured to store larger amounts of information than the memory. In certain examples, a non-transitory storage medium may store data that can, over time, change (e.g., in Random Access Memory (RAM) or cache). The communication unit 2112 can be, for e.g., configured to communicate the signals received from the mixed numerology handler 2106 in the system 1000. In another embodiment, the communication unit 2112 can be, for e.g., the wireless channel, etc.

The operations of the flexi generator 120/220 are detailed in the FIG. 1. Further, the flexi-OFDMA generator 120/220 includes.

The FIG. 21 shows exemplary hardware elements of the OFDM apparatus 100/200 but it is to be understood that other embodiments are not limited thereon. In other embodiments, the OFDM apparatus 100/200 may include less or more number of the hardware elements. Further, the labels or names of the hardware elements are used only for illustrative purpose and does not limit the scope of the invention. One or more hardware elements can be combined together to perform same or substantially similar function in the OFDM apparatus 100/200. For e.g., the OFDM apparatus 100/200 can include a multiple chain of the flexi-OFDMA generator 120/220.

The various actions, acts, blocks, steps, and the like in method may be performed in the order presented, in a different order or simultaneously. Further, in some embodiments, some actions, acts, blocks, steps, and the like may be omitted, added, modified, skipped, and the like without departing from the scope of the invention.

The embodiments disclosed herein can be implemented through at least one software program running on at least one hardware device and performing network management functions to control the elements. The elements shown in the FIGS. 1 to 21 include blocks which can be at least one of a hardware device, or a combination of hardware device and software unit.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. An Orthogonal Frequency Division Multiple Access (OFDMA) method for performing Orthogonal Frequency Division Multiplexing (OFDM) based communication in a wireless communication system, comprising:
    splitting by an first OFDMA apparatus a carrier bandwidth into a number of subbands;
    modulating by the first OFDMA apparatus resource units in each of the subbands with data symbols in a parallel manner;
    multiplexing by the first OFDMA apparatus the resource units by transforming each of the modulated resource units through a plurality of first unitary transformations;
    generating by the first OFDMA apparatus a plurality of first OFDM signals by performing a parallel to serial conversion of the transformed resource units;
    multiplexing by the first OFDMA apparatus samples of at least one OFDM signal from the plurality of first OFDM signals by transforming the samples through a second unitary transformation;
    generating by the first OFDMA apparatus a second OFDM signal by performing a parallel to serial conversion of the transformed samples; and
    transmitting by the first OFDMA apparatus the second OFDM signal over a wireless channel to a second OFDM apparatus in the wireless communication system.

2. The method of claim 1, wherein the plurality of first unitary transformation is one of an Inverse Fast Fourier Transform (IFFT), a Fast Fourier Transform (FFT) and other unitary transformation, wherein the second unitary transformation is one of an IFFT, a FFT and other unitary transformation.

3. The method of claim 1, wherein the plurality of first OFDM signals is one of a same OFDM symbol duration and a different OFDM symbol duration.

4. The method of claim 1, wherein the samples of the at least one OFDM signal from the plurality of first OFDM signals are sampled at a uniform interval.

5. The method of claim 1, wherein a numerology of each of the first unitary transformation is determined based on the carrier bandwidth and a size of corresponding unitary transformation.

6. The method of claim 5, wherein the numerology of the at least one unitary transformation from the plurality of first unitary transformations is multiplexed at the second unitary transformation, wherein the numerology multiplexed at the second unitary transformation is one of a same numerology, a different numerology and a mixed-numerology.

7. The method of claim 1, wherein the multiplexing is performed without using at least one of a guard band and a guard time.

8. The method of claim 1, wherein a channel handling technique is applied to at least one of the resource units of each of the subbands before transforming using the plurality of first unitary transformations, each of the subbands of each of the first OFDM signals before transforming using the second unitary transformation, and a block of OFDM sub-symbols of the second OFDM signal before transmitting over the wireless channel.

9. The method of claim 8, wherein the channel handling technique uses at least one of a cyclic prefix (CP), a zero tail (ZT), a known sequence (KS), a customized filter and a window.

10. The method of claim 9, wherein at least one of a guard band and a guard time is applied depending on at least one of the customized filter and the window used.

11. The method of claim 9, wherein the window used with the channel handling technique is one of a raised cosine (RC), a root raised cosine (RRC) window, and other Nyquist windows.

12. An Orthogonal Frequency Division Multiple Access (OFDMA) method for performing Orthogonal Frequency Division Multiplexing (OFDM) based communication in a wireless communication system, comprising:
    receiving by an OFDMA apparatus a first OFDM signal;
    performing by the OFDMA apparatus a serial to parallel conversion of the first OFDM signal;
    demultiplexing by the OFDMA apparatus samples of the first OFDM signal by transforming the samples through a first unitary transformation;
    performing by the OFDMA apparatus a serial to parallel conversion of the transformed samples of the first OFDM signal there by generating a plurality of second OFDM signals;
    demultiplexing by the OFDMA apparatus at least one second OFDM signal from the plurality of second OFDM signals by transforming the at least one second OFDM signal through a plurality of second unitary transformations; and
    obtaining by the OFDMA apparatus data symbols by demodulating the at least one transformed second OFDM signal in a parallel manner.

13. The method of claim 12, wherein the first unitary transformation is one of an Inverse Fast Fourier Transform (IFFT), a Fast Fourier Transform (FFT) and other unitary transformation, and wherein the plurality of second unitary transformations is one of an IFFT, a FFT and other unitary transformation.

14. The method of claim 12, wherein the samples of the at least one second OFDM signal from the plurality of second OFDM signals are sampled at a uniform interval.

15. The method of claim 12, wherein the numerology is demultiplexed at the first unitary transformation is one of a same numerology, a different numerology and a mixed-numerology, wherein the numerology of the at least one unitary transformation from the plurality of second unitary transformations is demultiplexed at the second unitary transformation.

16. The method of claim 12, wherein a channel handling technique is applied to at least one of a block of OFDM sub-symbols of the first OFDM signal before transforming through the first unitary transformation, each of the subbands of each of the second OFDM signals before transforming through the second unitary transformations, and the resource units at the output of the second unitary transformations.

17. The method of claim 16, wherein the channel handling technique uses at least one of a cyclic prefix removal, removing tail and overlapping in front, channel estimation, Frequency Domain Equalization (FDE), a customized filter and a window.

18. The method of claim 17, wherein the window used with the channel handling technique is one of a raised cosine (RC), a root raised cosine (RRC) window, and other Nyquist windows.

19. A wireless communication system for performing Orthogonal Frequency Division Multiple Access (OFDMA) in an Orthogonal Frequency Division Multiplexing (OFDM) based communication, comprising:
    a first OFDMA apparatus configured to:
        split a carrier bandwidth into a number of subbands,
        modulate resource units in each of the subbands with data symbols in a parallel manner,
        multiplex the resource units by transforming each of the modulated resource units through a plurality of first unitary transformations,
        generate a plurality of first OFDM signals by performing a parallel to serial conversion of the transformed resource units,
        multiplex samples of at least one OFDM signal from the plurality of OFDM signals by transforming the samples through a second unitary transformation,
        generate a second OFDM signal by performing a parallel to serial conversion of the transformed samples, and
        transmit the second OFDM signal over a wireless channel in the wireless network system; and
    a second OFDMA apparatus configured to:
        receive the second OFDM signal,
        perform a serial to parallel conversion of the received second OFDM signal,
        demultiplex samples of the second OFDM signal by transforming the samples through an inverse of the second unitary transformation,
        perform a serial to parallel conversion of the transformed samples of the second OFDM signal there by generating the plurality of first OFDM signals,
        demultiplex at least one second OFDM signal from the plurality of second OFDM signals by transforming the at least one second OFDM signal through a plurality of second unitary transformations, and
        obtain data symbols by demodulating the at least one transformed second OFDM signal in a parallel manner.

20. The system of claim 19, wherein the plurality of first unitary transformation is one of an Inverse Fast Fourier Transform (IFFT), a Fast Fourier Transform (FFT) and other unitary transformation, wherein the second unitary transformation is one of an Inverse Fast IFFT, a FFT and other unitary transformation.

21. The system of claim 19, wherein the plurality of first OFDM signals is one of a same OFDM symbol duration and a different OFDM symbol duration.

22. The system of claim 19, wherein a numerology of each of the first unitary transformation is determined based on the carrier bandwidth and a size of corresponding unitary transformation.

23. The system of claim 19, wherein a channel handling technique is applied by the first apparatus to at least one of each of the subbands of each of the first OFDM signals before transmitting to the second unitary transformation, a block of OFDM sub-symbols of the second OFDM signal before transmitting over the wireless channel, and the resource units before transmitting to the plurality of first unitary transformations.

24. The system of claim 22, wherein the channel handling technique uses at least one of a cyclic prefix (CP), a zero tail (ZT), a known sequence (KS), a customized filter and a window.

25. The system of claim 24, wherein at least one of a guard band and a guard time is applied depending on at least one of the customized filter and the window used.

26. The system of claim 24, wherein the window used with the channel handling technique is one of a raised cosine (RC), a root raised cosine (RRC) window, and other Nyquist windows.

27. The system of claim 19, wherein a channel handling technique is applied to at least one of a block of OFDM sub-symbols of the second OFDM signal before transforming through the inverse of second unitary transformation, each of the subbands of each of the first OFDM signals before transforming through the inverse of first unitary transformations, and the resource units at the output of the inverse of first unitary transformations.

28. The system of claim 26, wherein the channel handling technique uses at least one of a cyclic prefix removal, removing tail and overlapping in front, channel estimation, Frequency Domain Equalization (FDE), a customized filter and a window.

29. The system of claim 19, wherein the window used with the channel handling technique is one of a raised cosine (RC), a root raised cosine (RRC) window, and other Nyquist windows.

30. The method of claim 1, further comprises:
    receiving, by the second OFDM apparatus, the second OFDM signal;
    performing, by the second OFDM apparatus, a serial to parallel conversion of the received second OFDM signal;
    demultiplexing, by the second OFDM apparatus, samples of the second OFDM signal by transforming the samples through an inverse of the second unitary transformation;
    performing, by the second OFDM apparatus, a serial to parallel conversion of the transformed samples of the second OFDM signal there by generating the plurality of first OFDM signals;

demultiplexing at least one second OFDM signal from the plurality of second OFDM signals by transforming the at least one second OFDM signal through a plurality of second unitary transformations; and obtaining, by the second OFDM apparatus, data symbols by demodulating the at least one transformed second OFDM signal in a parallel manner.

31. An Orthogonal Frequency Division Multiple Access (OFDMA) apparatus for performing Orthogonal Frequency Division Multiplexing (OFDM) based communication in a wireless communication system, comprising:
a memory;
a processor; and
at least one flexi-OFDMA generator, coupled to the memory and the processor, configured for:
splitting a carrier bandwidth into a number of subbands,
modulating resource units in each of the subbands with data symbols in a parallel manner,
multiplexing the resource units by transforming each of the modulated resource units through a plurality of first unitary transformations,
generating a plurality of first OFDM signals by performing a parallel to serial conversion of the transformed resource units,
multiplexing samples of at least one OFDM signal from the plurality of first OFDM signals by transforming the samples through a second unitary transformation,
generating a second OFDM signal by performing a parallel to serial conversion of the transformed samples, and
transmitting the second OFDM signal over a wireless channel in the wireless network system.

32. The OFDMA apparatus of claim 31, wherein the plurality of first unitary transformation is one of an Inverse Fast Fourier Transform (IFFT), a Fast Fourier Transform (FFT) and other unitary transformation, wherein the second unitary transformation is one of an IFFT, a FFT and other unitary transformation.

33. The OFDMA apparatus of claim 31, wherein the plurality of first OFDM signals is one of a same OFDM symbol duration and a different OFDM symbol duration.

34. The OFDMA apparatus of claim 31, wherein the samples of the at least one OFDM signal from the plurality of first OFDM signals are sampled at a uniform interval.

35. The OFDMA apparatus of claim 31, wherein a numerology of each of the unitary transformation from the plurality of first unitary transformations is determined based on the carrier bandwidth and a size of corresponding unitary transformation.

36. The OFDMA apparatus of claim 31, wherein the numerology of the at least one unitary transformation from the plurality of first unitary transformations is multiplexed at the second unitary transformation, wherein the numerology multiplexed at the second unitary transformation is one of a same numerology, a different numerology and a mixed-numerology.

37. The OFDMA apparatus of claim 31, wherein the multiplexing is performed without using at least one of a guard band and a guard time.

38. The OFDMA apparatus of claim 31, wherein a channel handling technique is applied to at least one of each of the subbands of each of the first OFDM signals before transmitting the first OFDM signals to the second unitary transformation, a block of OFDM sub-symbols of the second OFDM signal before transmitting over the wireless channel, and the resource units before transmitting to the plurality of first unitary transformations.

39. The OFDMA apparatus of claim 31, wherein the channel handling technique uses at least one of a cyclic prefix (CP), a zero tail (ZT), a known sequence (KS), a customized filter and a window.

40. The OFDMA apparatus of claim 31, wherein at least one of a guard band and a guard time is applied depending on at least one of the customized filter and the window used.

41. The OFDMA apparatus of claim 31, wherein the window used with the channel handling technique is one of a raised cosine (RC), a root raised cosine (RRC) window, and other Nyquist windows.

42. An Orthogonal Frequency Division Multiple Access (OFDMA) apparatus for performing Orthogonal Frequency Division Multiplexing (OFDM) based communication in a wireless communication system, comprising:
a memory;
a processor; and
at least one flexi-OFDMA generator, coupled to the memory and the processor, configured for:
receiving a first OFDM signal,
performing a serial to parallel conversion of the first OFDM signal,
demultiplexing samples of the first OFDM signal by transforming the samples through a first unitary transformation,
performing a serial to parallel conversion of the transformed samples of the first OFDM signal there by generating a plurality of second OFDM signals,
demultiplexing at least one second OFDM signal from the plurality of second OFDM signals by transforming the at least one second OFDM signal through a plurality of second unitary transformations, and
obtaining data symbols by demodulating the at least one transformed second OFDM signal in a parallel manner.

43. The OFDMA apparatus of claim 42, wherein the first unitary transformation is one of an Inverse Fast Fourier Transform (IFFT), a Fast Fourier Transform (FFT) and other unitary transformation, and wherein the plurality of second unitary transformations is one of an IFFT, a FFT and other unitary transformation.

44. The OFDM apparatus of claim 42, wherein the plurality of second OFDM signals is one of a same OFDM symbol duration and a different OFDM symbol duration.

45. The OFDMA apparatus of claim 42, wherein samples of the at least one second OFDM signal from the plurality of second OFDM signals are sampled at a uniform interval.

46. The OFDMA apparatus of claim 42, wherein a numerology of each of the unitary transformation from the plurality of second unitary transformations is determined based on a carrier bandwidth and a size of corresponding unitary transformation.

47. The OFDMA apparatus of claim 46, wherein the numerology is demultiplexed at the first unitary transformation is one of a same numerology, a different numerology and a mixed-numerology, wherein the numerology of the at least one unitary transformation from the plurality of second unitary transformations is demultiplexed at the second unitary transformation.

48. The OFDMA apparatus of claim 42, wherein a channel handling technique is applied to at least one of a block of OFDM sub-symbols of the first OFDM signal before transforming through the first unitary transformation, each of the subbands of each of the second OFDM signals before transforming through the second unitary transformations, and the resource units at the output of the second unitary transformations.

49. The OFDMA apparatus of claim 48, wherein the channel handling technique uses at least one of a cyclic prefix removal, removing tail and overlapping in front, channel estimation, Frequency Domain Equalization (FDE), a customized filter and a window.

50. The OFDMA apparatus of claim 49, wherein the window used with the channel handling technique is one of a raised cosine (RC), a root raised cosine (RRC) window and other Nyquist windows.

* * * * *